(12) United States Patent
Shivaji-Rao et al.

(10) Patent No.: US 8,001,236 B2
(45) Date of Patent: Aug. 16, 2011

(54) METHODS AND SYSTEMS FOR CONTENT-CONSUMPTION DEVICE MONITORING AND CONTROL

(75) Inventors: Vishnu-Kumar Shivaji-Rao, Vancouver, WA (US); David C. Barton, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 104 days.

(21) Appl. No.: 12/047,594

(22) Filed: Mar. 13, 2008

(65) Prior Publication Data

US 2009/0234939 A1 Sep. 17, 2009

(51) Int. Cl.
*G06F 15/173* (2006.01)
(52) U.S. Cl. ............. 709/224; 725/93; 725/55; 386/291
(58) Field of Classification Search .......... 725/118, 725/61, 114, 93, 55; 455/412.1, 403; 345/211; 348/563; 386/83, 291; 709/224
See application file for complete search history.

(56) References Cited

U.S. PATENT DOCUMENTS

| | | | |
|---|---|---|---|
| 4,942,472 A | 7/1990 | Imbert et al. | |
| 5,274,448 A | 12/1993 | Lenz et al. | |
| 6,202,210 B1 | 3/2001 | Ludtke | |
| 6,292,172 B1 | 9/2001 | Makhlouf | |
| 6,756,997 B1 | 6/2004 | Ward, III et al. | |
| 6,819,364 B2 | 11/2004 | Creed et al. | |
| 7,039,698 B2 | 5/2006 | Slemmer et al. | |
| 7,114,167 B2 | 9/2006 | Slemmer et al. | |
| 7,142,230 B2 | 11/2006 | Novak et al. | |
| 7,543,325 B2* | 6/2009 | Westbrook et al. | 725/93 |
| 2002/0149705 A1 | 10/2002 | Allen et al. | |
| 2002/0168177 A1* | 11/2002 | Kajitani | 386/83 |
| 2003/0055974 A1 | 3/2003 | Brophy et al. | |
| 2003/0105805 A1 | 6/2003 | Jorgenson | |
| 2003/0220901 A1 | 11/2003 | Carr et al. | |
| 2004/0068573 A1 | 4/2004 | Corbeil | |
| 2004/0073432 A1 | 4/2004 | Stone | |
| 2005/0073518 A1* | 4/2005 | Bontempi | 345/211 |
| 2005/0141542 A1 | 6/2005 | Handekyn et al. | |
| 2005/0149980 A1 | 7/2005 | Yun | |
| 2005/0174488 A1 | 8/2005 | Chennakeshu | |
| 2005/0210135 A1 | 9/2005 | Abrahams et al. | |
| 2005/0261985 A1 | 11/2005 | Miller et al. | |
| 2006/0078072 A1 | 4/2006 | Cheon et al. | |
| 2006/0105749 A1* | 5/2006 | Han et al. | 455/412.1 |
| 2006/0184681 A1 | 8/2006 | Bernardi et al. | |
| 2006/0253886 A1* | 11/2006 | Khurana et al. | 725/118 |
| 2007/0143797 A1* | 6/2007 | Sammarco | 725/61 |
| 2007/0156805 A1 | 7/2007 | Bristol et al. | |
| 2008/0012987 A1* | 1/2008 | Hirata et al. | 348/563 |
| 2009/0064252 A1* | 3/2009 | Howarter et al. | 725/114 |

FOREIGN PATENT DOCUMENTS

| | | |
|---|---|---|
| EP | 1517259 A1 | 3/2005 |
| WO | WO01/33858 A1 | 5/2001 |
| WO | WO03/044684 A1 | 5/2003 |
| WO | WO2005/059767 A1 | 6/2005 |

* cited by examiner

*Primary Examiner* — Jungwon Chang
(74) *Attorney, Agent, or Firm* — Kristine E. Matthews; David C. Ripma

(57) ABSTRACT

Aspects of the present invention relate to systems and methods for remote monitoring and control of a content-consumption device.

20 Claims, 33 Drawing Sheets

METHODS AND SYSTEMS FOR CONTENT-CONSUMPTION DEVICE MONITORING AND CONTROL

RELATED REFERENCES

U.S. patent application Ser. No. 11/367,939, entitled "Methods and Systems for Configuring Media-Playing Sets," filed on Mar. 3, 2006; U.S. patent application Ser. No. 11/367,937, entitled "Methods and Systems for Configuring Media-Playing Sets," filed on Mar. 3, 2006; and U.S. patent application Ser. No. 11/838,188, entitled "Methods and Systems for Multiple-Device Session Synchronization," filed on Aug. 13, 2007, are hereby incorporated herein by reference.

FIELD OF THE INVENTION

Embodiments of the present invention comprise methods and systems for content-consumption device monitoring and control.

BACKGROUND

As increasing numbers of content-consumption devices and other devices may be capable of inter-connection and of connection to computer, and other, networks, there may be a need for content-consumption device monitoring and control.

SUMMARY

Some embodiments of the present invention may comprise methods and systems for content-consumption device monitoring and control.

Some embodiments of the present invention may comprise a server system wherein the server system may receive a monitoring or control request from a monitoring device for a content-consumption device. In some embodiments, the server system may send the content-consumption device a content-capture request. The content-consumption device may capture content and send the captured content to the server system. The server system may send the captured content to the monitoring device. In some embodiments, the server system may send a control request to the content-consumption device. In some embodiments, the server system may send a message to the content-consumption device. In some embodiments, the server system may process the captured content received from the content-consumption device and may send the processed captured content to the monitoring device.

Some embodiments of the present invention may comprise a monitoring device for monitoring a content-consumption device. In some embodiments, the monitoring device may send a content-capture request for the content-consumption device to a server system. The server system may request the content-capture from the content-consumption device. In some embodiments, the monitoring device may send a message for the content-consumption device to the server system. In some embodiments, the monitoring device may send a control request for the content-consumption device to the server system.

Some embodiments of the present invention may comprise a content-consumption device, wherein the content-consumption device may be monitored or controlled by a monitoring device through a server system.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a drawing showing embodiments of the present invention comprising a server system and an electronic device;

FIG. 2. is a chart showing an exemplary SSL handshake protocol;

DETAILED DESCRIPTION OF EXEMPLARY EMBODIMENTS

Figure 1:
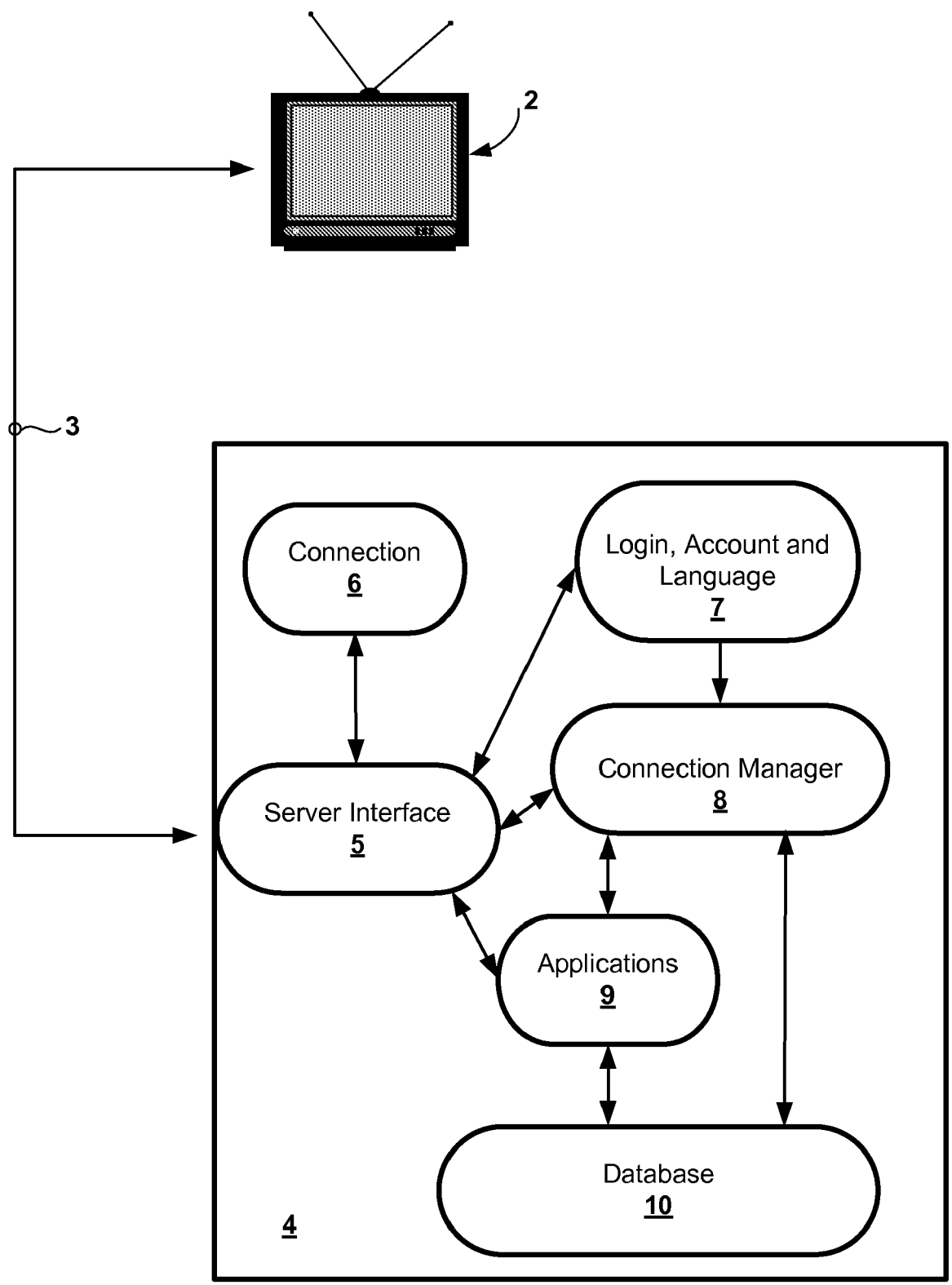

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Many electronic devices may connect to computer, and other, networks and may offer connected features, for example, Instant Messaging (IM), electronic mail (email) and web browsing. A connected feature may be a proprietary feature unique to a device, or a connected feature of a device may emulate a connected feature of another device. Many connected features may offer user experiences that persist only on a session basis within a device. There has been considerable progress in making content available to many kinds of devices through the standardization of sound formats and transport mechanisms, video formats and transport mechanisms, email formats and transport mechanisms and other standardization efforts. However, there exists a standard method for providing device-independent, autonomous features with user sessions that may be portable between devices. Some embodiments of the present invention comprise methods and systems for device-independent, autonomous user session portability.

Some embodiments of the present invention comprise methods and systems for inter-connection of electronic devices. Exemplary electronic devices may comprise media-playing devices (e.g., a television or a handheld DVD (Digital Versatile Disc, sometimes referred to as Digital Video Disc) player), computing devices (e.g., a personal computer), communication devices (e.g., a cellular telephone), imaging devices (e.g., a digital camera or a video camera) and other electronic devices (e.g., a PDA (Personal Digital Assistant) or a game device). An electronic device may belong to several of the exemplary categories enumerated above. For example, some communication devices, such as some cellular telephones, may also be considered media-play devices and imaging devices.

In some embodiments of the present invention, an electronic device, also considered a client device, may be connected through a remote server at a customer support center to a customer-support computing device. In some embodiments the customer-support computing device may be associated with a customer service representative. In alternative embodiments of the present invention, a first electronic device may be connected through a remote server to a second electronic device. In some embodiments, both the first electronic device and the second electronic device may be under the control of a single user. In alternative embodiments, the first electronic device may be under the control of a first user, and the second electronic device may be under the control of a second user.

In some embodiments of the present invention, a client device may comprise a display, a user input device (e.g., a keyboard, a mouse or a remote control), network connectivity and software. Exemplary client-device software may comprise a network TCP/IP (Transmission Control Protocol/Internet Protocol) stack, a network SSL (Secure Sockets Layer) software stack, network-connectivity client software (e.g., an HTTP (HyperText Transfer Protocol) client) and other software.

In some embodiments of the present invention, a server system may comprise a processor, a storage device, network connectivity and software. In alternative embodiments, a server system may further comprise a display. Exemplary server software may comprise server management tools, a network TCP/IP stack, a network SSL software stack, network-connectivity server software (e.g., Apache HTTP server), an FTP (File Transfer Protocol) server, a mail server and other software.

Some embodiments of the present invention may be described in relation to FIG. 1. An electronic device 2 may be communicatively coupled 3 to a server system 4. The server system 4 may comprise a server interface 5 through which a connection component 6 may manage the initial process of connecting the electronic device 2 and the server system 4 software. The server system 4 may further comprise a login, account and language (LAL) component 7, a customer-connection-page manager 8, a plurality of applications 9 and a database 10. In some embodiments of the present invention, the above-enumerated components may reside on a single server device. In alternative embodiments, portions of the server system 4 may reside on multiple server devices (e.g., a communication server, an application server and other servers).

The connection component 6 may manage authentication and encryption portions of the communication between the electronic device, also considered the client, 2 and the server system 4. In some embodiments of the present invention, the connection component 6 may be based on an SSL protocol.

Figure 2:
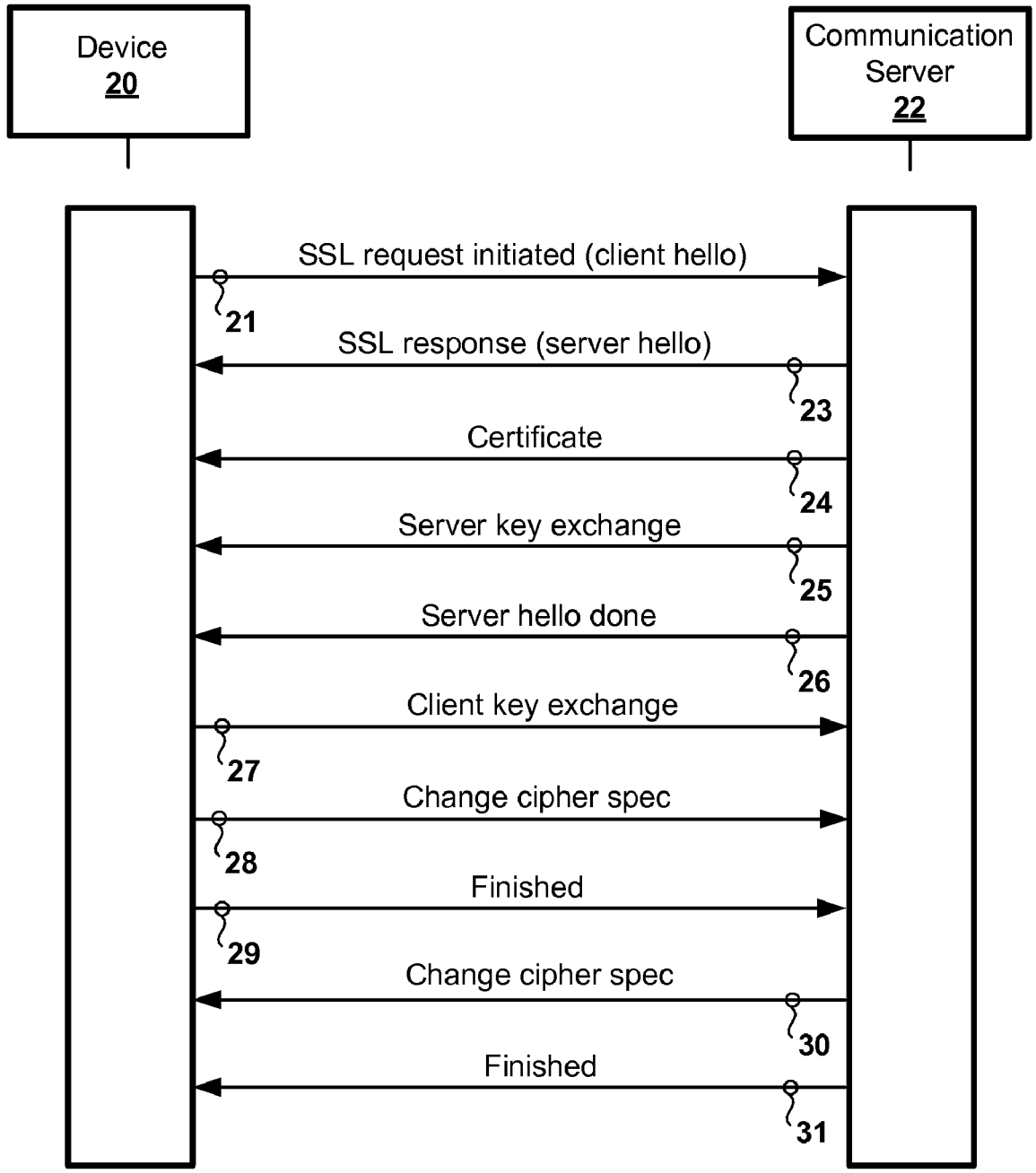

An exemplary SSL handshake protocol may be described in relation to FIG. 2. An electronic device 20 may send an SSL request ("ClientHello") 21 to a server 22 to initiate the negotiation of SSL session characteristics. The server authentication and key exchange may then occur. The server 22 may respond 23 to the device-initiated "ClientHello" message with a "ServerHello." Next the server 22 may send its certificate, and associated certificate chain, 24 to the electronic device 20. The server 22 may then send a public key 25 followed by an end message 26. The client key exchange 27 may then occur from the electronic device 20 to the server 22. The electronic device 20 may tell 28 the server 22 to change cipher and the server 22 may respond 30 with its own changed cipher message. Finished messages 29, 31 may be hashes for verification.

Figure 3:
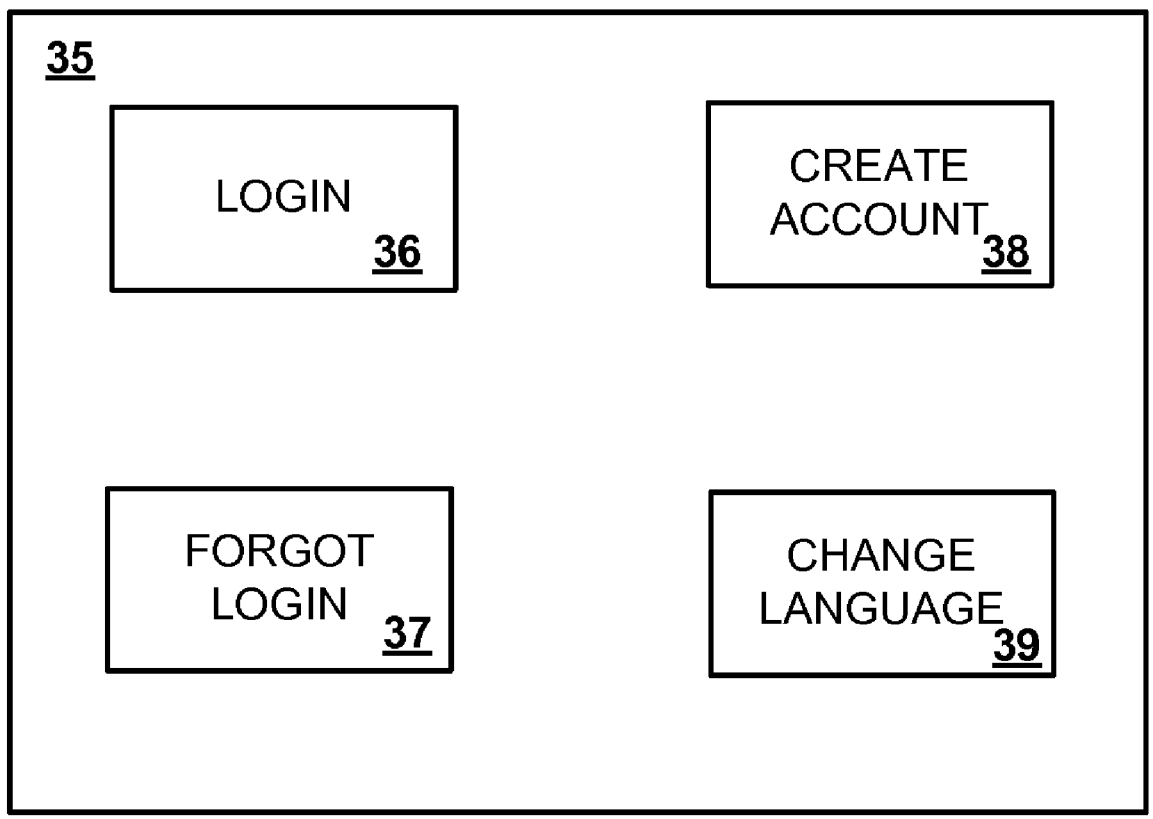
FIG. 3 is a drawing showing an exemplary options display.

In some embodiments of the present invention, the LAL component 7 may be responsible for presenting and handling the login process for valid clients, creating valid client accounts on the server 4, retrieving valid client account information, deleting client account information from the server 4 and creating, on the server 4, a language preference for connected clients. Login, account and language options may be presented via a graphical user interface (GUI) on the electronic device 2. FIG. 3 depicts an exemplary options display 35 on an exemplary electronic device with four options 36, 37, 38, 39. Upon receiving a selection through the GUI, the electronic device 2 may transmit the selection to the server 4.

Figure 4:
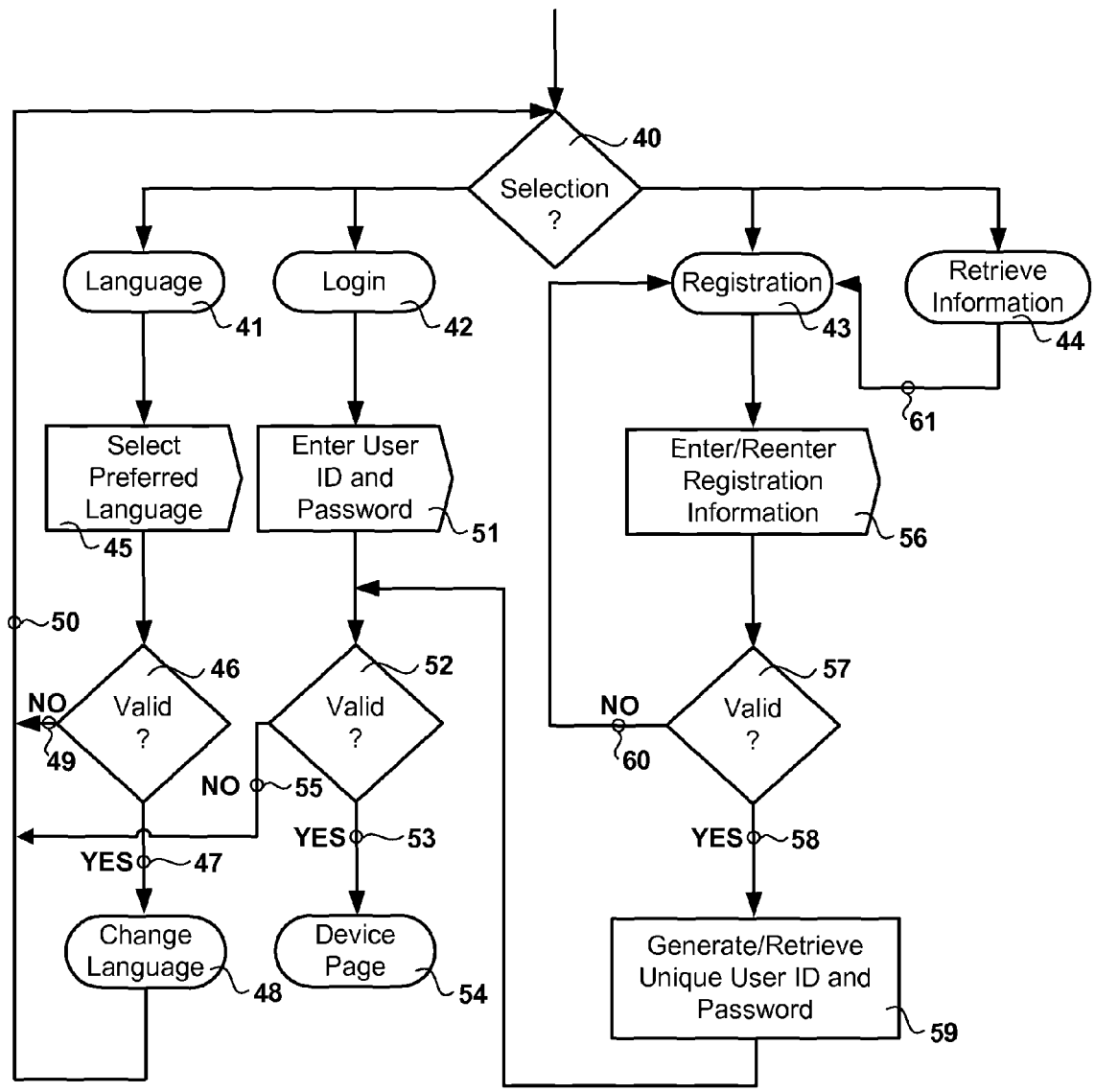
FIG. 4 is a chart showing embodiments of the present invention comprising an exemplary embodiment of a login, account and language (LAL) component.

An exemplary embodiment of the LAL component 7 may be described in relation to FIG. 4. The LAL component 7 may receive a selection 40 sent from the electronic device 2 to the server 4. In some embodiments of the present invention, the selection may be related to one of the following options: "language" option 41, "login" option 42, "registration" option 43, and "retrieve information" option 44. The options may correspond to the options displayed at the electronic device GUI.

If the "language" option 41 is received, then the LAL component 7 may request 45 a preferred language selection from the electronic device. Upon receipt of the preferred language selection, the LAL component 7 may determine 46 if the preferred language selection is a valid selection. If the preferred language selection is a valid selection 47, then the LAL component 7 may change 48 the language setting and then may request 50 a new selection. If the preferred language selection is not a valid selection 49, then the LAL component 7 may request 50 a new selection.

If the "login" option 42 is received, then the LAL component 7 may request 51 login information from the electronic device. Exemplary login information may comprise a user identification (ID), a password and other login information. Upon receipt of the login information, the LAL component 7 may determine 52 if the login information is valid. If the login information is valid 53, then the LAL component 7 may transfer control 54 to the connection manager 8. If the login information is not valid 55, then the LAL component 7 may request 50 a new selection.

If the "registration" option 43 is received, then the LAL component 7 may request 56 registration information. Exemplary registration information may comprise electronic device model, serial number, device owner telephone number, device location zip code and other product or product owner information. Upon receipt of the registration information, the LAL component 7 may determine 57 if the registration information is valid. If the registration information is valid 58, then the LAL component 7 may generate unique login information 59 and determine 52 if the login information is valid. If the registration information is not valid 60, the LAL component 7 may return to the "registration" option 43 selection in order to request registration information again.

If the "retrieve information" option 44 is selected, then the LAL component 7 may redirect 61 to the "registration" option 43. This may allow login information to be retrieved 59 after re-entry of valid registration information.

In some embodiments of the present invention, the connection manager component 8 may be responsible to access and interpret a customer profile. The connection manager component 8 may populate a customer connection page with required support information and features. The connection manager component 8 may also maintain the customer account information page and initiate any valid support or feature selected by a user at the electronic device 2.

Figure 5:
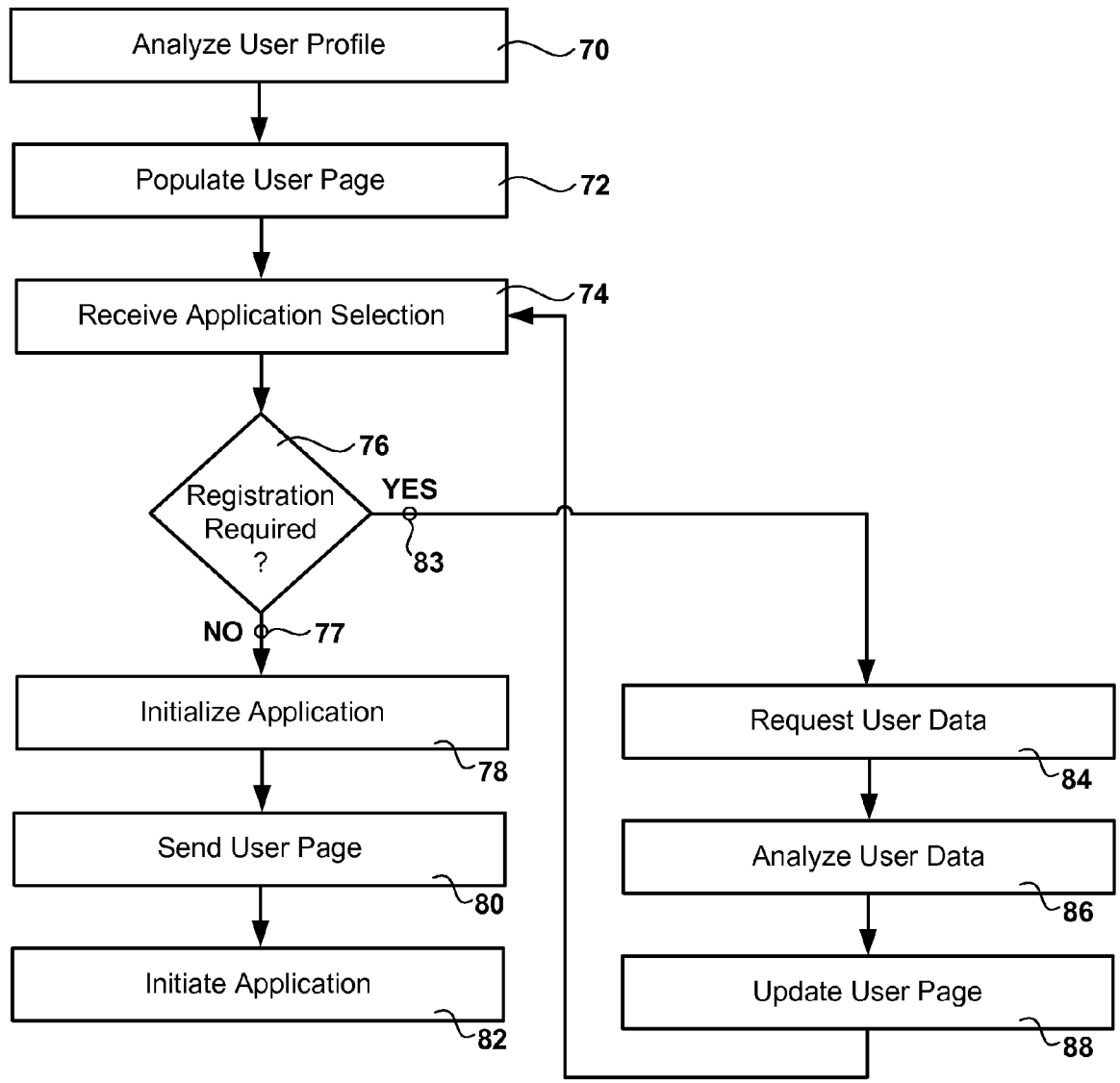
FIG. 5 is chart showing embodiments of the present invention comprising an exemplary embodiment of a connection manager component.

An exemplary embodiment of a connection manager component 8 may be described in relation to FIG. 5. After analyzing 70 a user profile, the connection manager component 8 may populate 72 a user page. The user page may be populated with user data obtained from a database 10. Then upon receipt of an application 9 selection 74 from the electronic device 2, the connection manager component 8 may determine 76 if application-specific registration is required. If application-specific registration is not required 77, then the selected application may be initialized, the user page presented 80 and the selected application initiated 82. If application-specific registration is required 83, then the connection manager component 8 may request 84 user data from the user or the database 10, analyze 86 the user data and update 88 the user page.

Exemplary applications may comprise device remote-control help, device menu control help, device product manual, device customer agent driver frequently asked question (FAQ) help, device-to-device message transfer, user-to-user message transfer and other applications. In some embodiments of the present invention, applications follow a model-view -controller structure.

Figure 6:
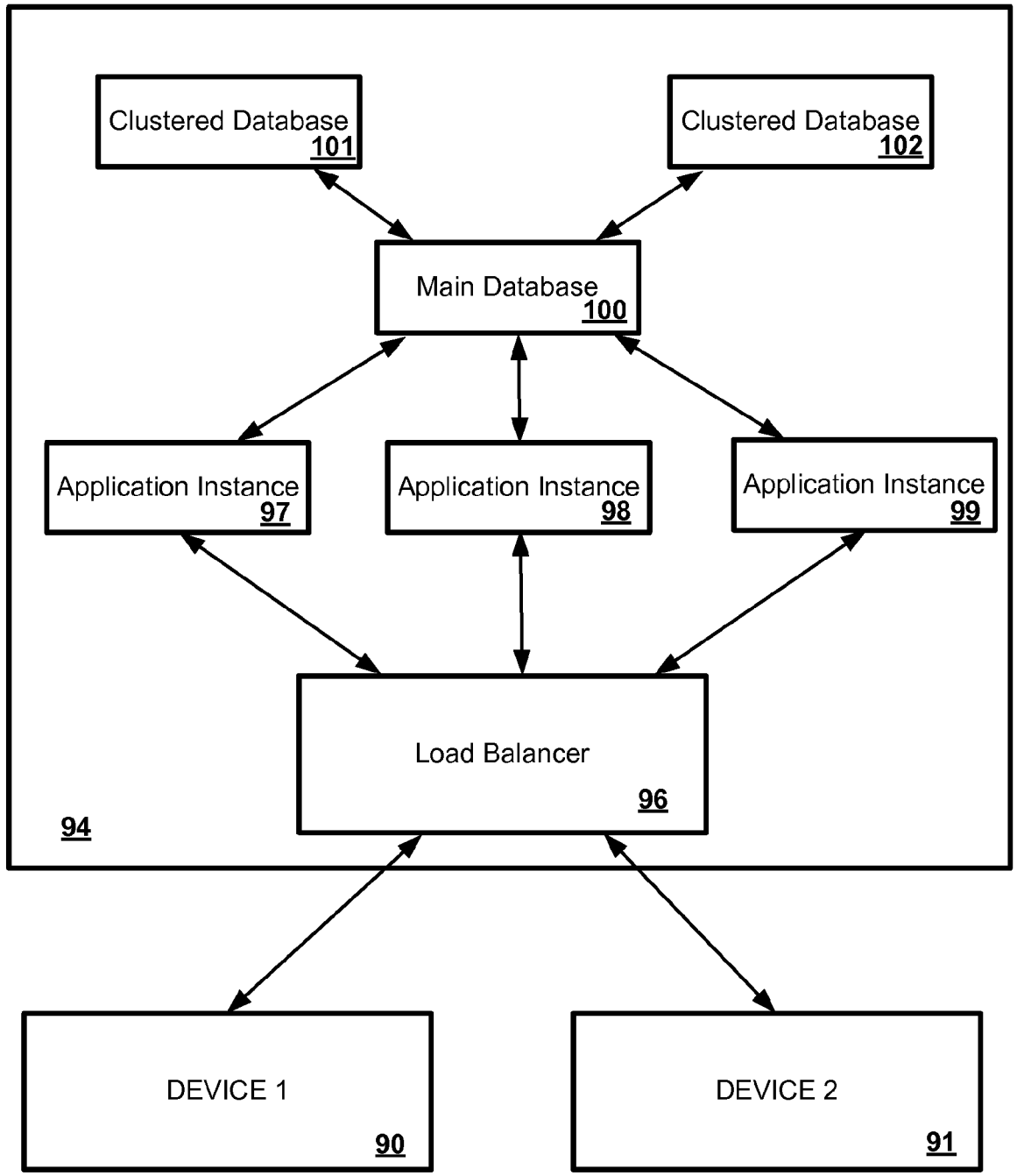
FIG. 6 is a drawing showing embodiments of the present invention comprising a server system and electronic devices.

In some embodiments of the present invention described in relation to FIG. 6, a first electronic device 90 may connect to a second electronic device 92 through a server system 94 which may comprise a load balancer 96, multiple application instances (three shown) 97, 98, 99 which may reside on multiple central processing units (CPUs), a main database 100 and multiple clustered databases (two shown) 101, 102. In some embodiments, communication between an electronic device 90, 91 and the server system 94 may comprise HTTP-XML (eXtensible Markup Language). The main database 100 and/or a database in the clustered databases 101, 102 may record every transaction between the first electronic device 90 and the second electronic device 92. The transactions may be linked together by the request parameters. In some embodiments of the present invention, the second electronic device 92 may be associated with a customer service representative. In alternative embodiments of the present invention, the second electronic device 92 may be associated with the owner of the first electronic device 90. In yet alternative embodiments of the present invention, the second electronic device 92 may be associated with a second owner.

Figure 7:
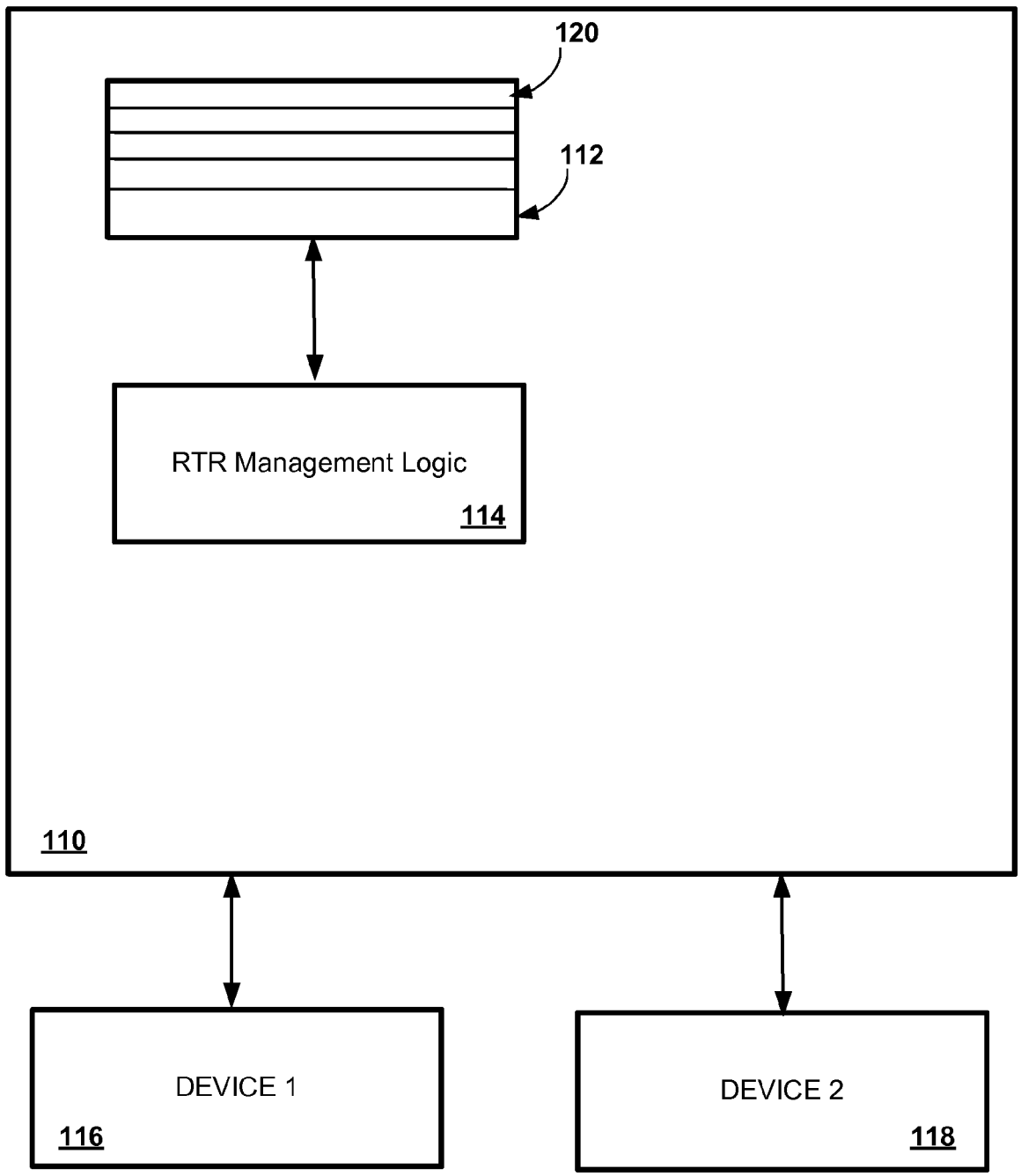
FIG. 7 is drawing showing embodiments of the present invention comprising a real-time-request database construct.

In some embodiments of the present invention described in relation to FIG. 7, a server system 110 may comprise, for recording and linking transactions, a real-time-request (RTR) database construct 112, for example a table, array or other database structure, and RTR management logic 114. The RTR management logic 114 may be embodied in software, hardware, firmware or a combination of such. Transactions between a first client device 116 and a second client device 118 may be handled through the server system 110 by the RTR management logic 114. An RTR database construct 112 may comprise a linked list of database entries, wherein each entry may represent a step in a storyline for a client device, 116, 118. An RTR database entry 120 may comprise generic data fields and other utility fields to accommodate single and multiple client storylines that may be step-synchronized between clients. The generic data fields may provide two-way communication between step-synchronized clients. In some embodiments, these fields may serve as semaphores for HTTP communication by communicating to client threads within an application instance. The communication may instruct a client thread to create, delay or otherwise process an HTTP response in relation to the actions of another client.

In some embodiments of the present invention, credentials may be included in every HTTP request. Exemplary credential may include username, password, client type and other credentials. In some embodiments, the credentials may be included as URL (Universal Resource Locator) parameters. In some embodiments of the present invention, a unique client-storyline identifier may be provided in each request which may be used the RTR management logic 114 to associate client requests with the appropriate multi-client storyline.

In some embodiments of the present invention, an RTR database entry 120 may not comprise a branch and may contain a single reference to a parent RTR database entry 120. Simultaneous features for a client device may be accommodated by simultaneous and separate storylines and RTR threads. An RTR database entry 120 may be a storyline step and may be used by any client device that may accommodate a single or multi-user storyline.

Figure 8:
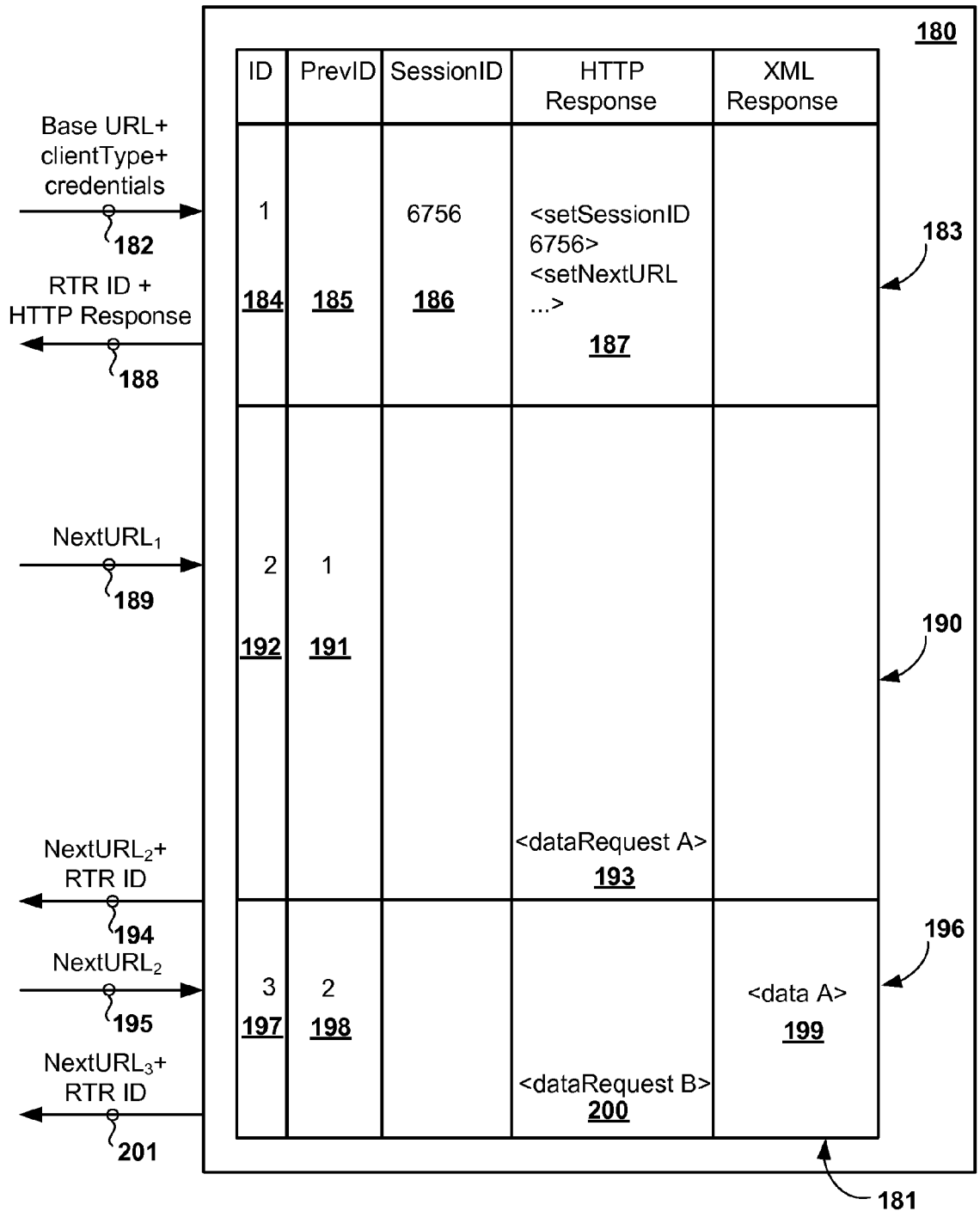
FIG. 8 is a drawing showing an exemplary transaction between a server system and an electronic device.

An exemplary transaction between a first client device and a server system may be described in relation to FIG. 8. In some embodiments of the present invention, a first client device may make a first request 182 to a server system 180 using a base location identifier associated with the server system 180. In some embodiments of the present invention, the base location identifier may comprise a URL, as shown in the exemplary transaction of FIG. 8. The client credentials and the client type for the first client device may be included in the parameters of the request 182. An entry 183 corresponding to the request 182 may be made in an RTR database construct 181 by RTR management logic. The entry 183 may comprise an RTR entry identifier (ID) 184, a previous RTR entry identifier (PrevID) 185, a session identifier (SessionID) 186 and other fields. In some embodiments of the present invention, the previous RTR entry identifier, PrevID, 185 may be null for the initial entry in the RTR database construct 181.

The RTR management logic may wait for an HTTP response field entry 187 corresponding to the first entry 183 to appear. In some embodiments, the wait may be effectuated by periodic polling, for example, polling every 0.5 seconds.

In some embodiments, for an initial call to the server system 180, the URL may not specify a class or a method, and the "DirectAction" class and the "DefaultAction" may be used by default. The "DirectAction" class may be loaded. "PerformActionNamed" may be executed, which may call "ValidDevice" in order to authenticate the request 182 with the first client device credentials received as parameters in the HTTP request 182. A "ValidDevice" object may be returned with a reference to the newly created RTR database construct 181. "DefaultAction" may then be called, which may create a "DeviceLoggedIn" object, which may return an XML response setting the session identifier, sessionID, and next URL (nextURL). The next URL, nextURL, may be computed by the "RealTimeRequest" class based on the previous RTR identifier, PrevID, 185 and the type of transaction. In some embodiments of the present invention, the RTR management logic may create a different URL for a transaction which may not wait for a client response and a transaction which may wait for a client response.

The server system 180, through the RTR management logic, may assign the session identifier, SessionID, 186 and may populate the HTTP Response field 187 in the RTR database construct 181 with an XML command to set the session identifier, sessionID, 186 and the next URL, $nextURL_1$. In some embodiments, the next URL, $nextURL_1$, may comprise a reference to the RTR entry identifier, ID, 184. The RTR management logic may detect the HTTP response 187 in the RTR database construct 181, and may copy the response 187 into the body of an HTTP response and may send 188 the response to the first client device.

The first client device may record the session identifier locally, for example in a graphical user interface or other location, and the first client device may then call 189 the next URL, $nextURL_1$. The next URL, $nextURL_1$, may contain a reference to the previously created RTR entry 183. The RTR management logic may create a new RTR entry 190 which may be linked to the previous RTR entry 183. In some embodiments, the linking may be effectuated by setting the previous RTR identifier, PrevID, field 191 to that value which identifies the previous RTR entry 184. A new RTR identifier 192 may be assigned.

A first data request to the client device may be made through the RTR database construct 181 by populating the HTTP Response portion 193 of the RTR database construct 181. The RTR management logic may detect the response 193 in the RTR database construct 181, and may send 194, in an XML command in the body of the HTTP response, the data request and a next URL, $nextURL_2$, to the first client device. The next URL, $nextURL_2$, may be encoded for the RTR thread. The first client device may call 195 the next URL, $nextURL_2$, with the requested data in the body of the request.

The next URL, $nextURL_2$, may contain a reference to the previously created RTR entry 190. The RTR management logic may create a new RTR entry 196 which may be linked to the previous RTR entry 190. In some embodiments, the linking may be effectuated by setting the previous RTR identifier, PrevID, field 198 in the new entry 196 to that value which identifies the previous RTR entry 192. A new RTR identifier 197 may be assigned. The RTR management logic may detect the data in the body of the request and may populate the XML response portion 199 of the RTR entry 196. A second data request may be made through the RTR database construct 181 by populating the HTTP Response portion 200 of the RTR database construct 181. The RTR management logic may detect the response 200 in the RTR database construct 181, and may send 201, in an XML command in the body of the HTTP response, the data request and a next URL, $nextURL_3$, to the first client device. The next URL, $nextURL_3$, may be encoded for the RTR thread.

In some embodiments of the present invention, the URLs, URL, $URL_1$, $URL_2$ and $URL_3$ may be distinct. In alternative embodiments of the present invention, the URLs may not be distinct.

Figure 9:
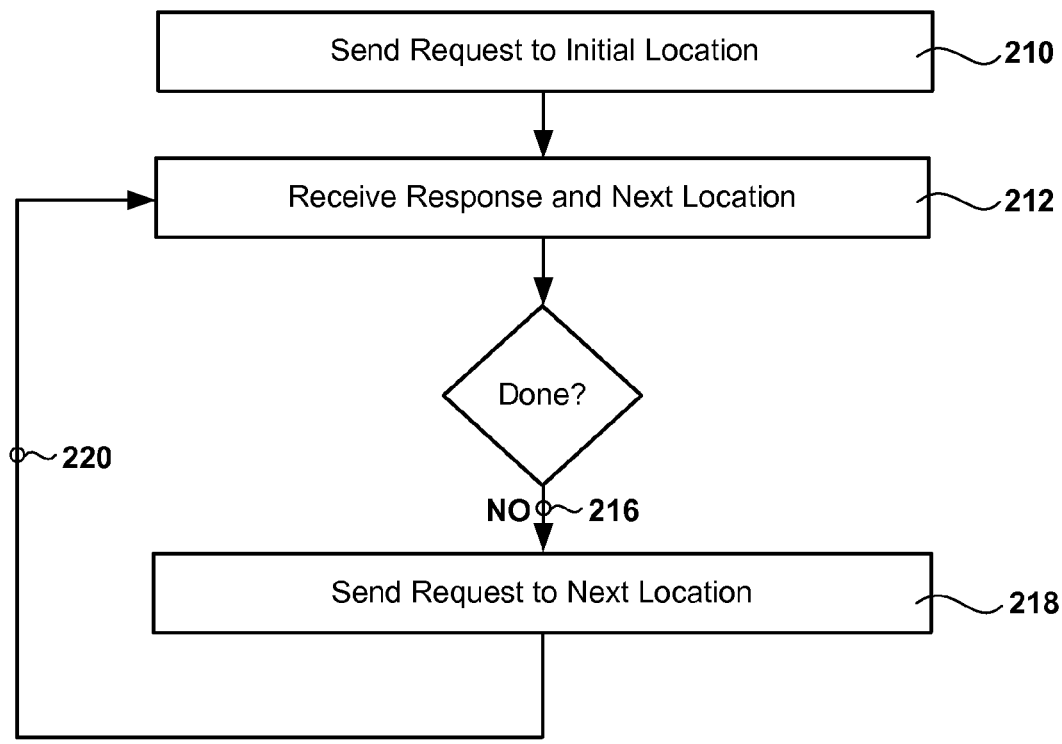
FIG. 9 is chart showing embodiments of the present invention comprising a an electronic device wherein the location for requests from the electronic device may be transmitted from the server system to the electronic device.

Some embodiments of the present invention may be described in relation to FIG. 9. A client device may send 210 a request to an initial location, for example the URL of a server or server system. The client device may receive 212 a response to the request and a next location to which the next request from the client may be sent. If the client device has not completed 216 the interaction with the server system, then the client device may send 218 the next request to the next location that was received 212 in the response from the from the server system. The request/response cycle may continue 220. In some embodiments of the present invention, the response from the server system received 212 at the client device may comprise a data request, instructions for the client device or other information in addition to the next location information. The request sent 218 from the client device to the server system may comprise data in addition to a request.

Figure 10:
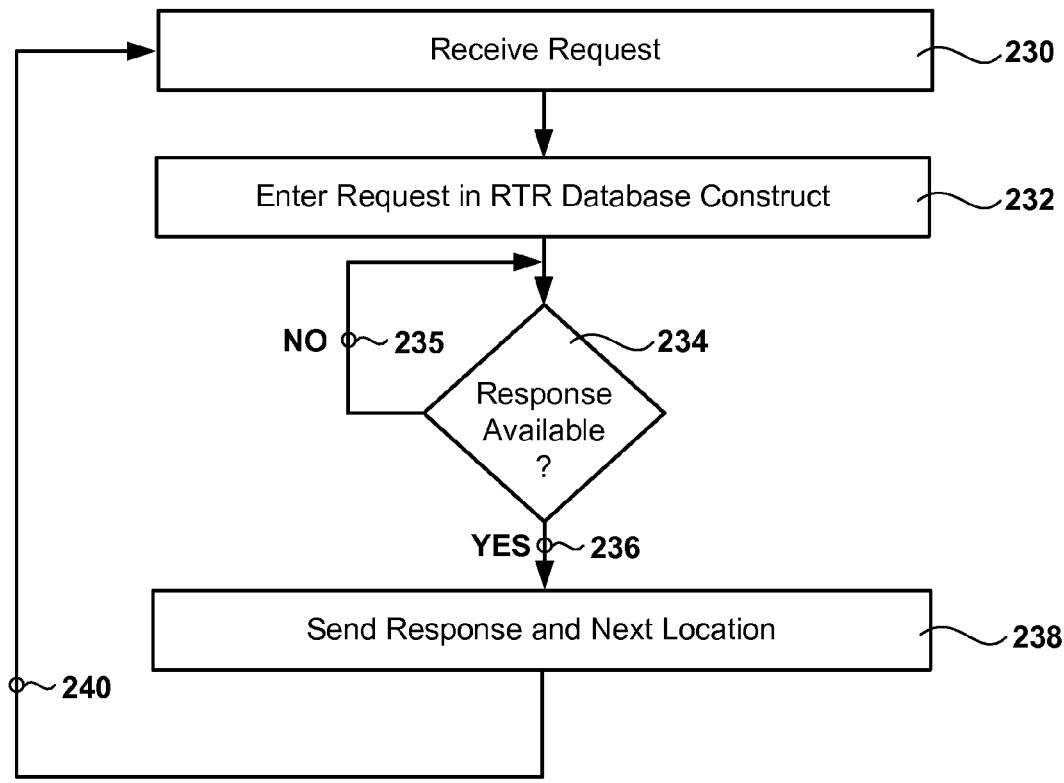
FIG. 10 is a chart showing embodiments of the present invention comprising a server system wherein the location for requests from an electronic device may be transmitted form the server system to the electronic device.

Some embodiments of the present invention may be described in relation to FIG. 10. A server system may receive 230 a request from a client device. The server system may enter 232 the request in an RTR database construct. The server system may determine 234 if a response to the request is available. If a response is not available 235, the server system may wait for a response to become available. When a response is available 236, the server system may send 238 the response and the location for a next request to the client device. The server system may then receive additional requests from the client device, continuing 240 the request/response cycle. When a request is entered 232 into the RTR database construct, the entry may be linked to previous entries in the thread or storyline. The response sent 238 to the client device may comprise instructions for the client device, a data request or other information.

Figure 11:
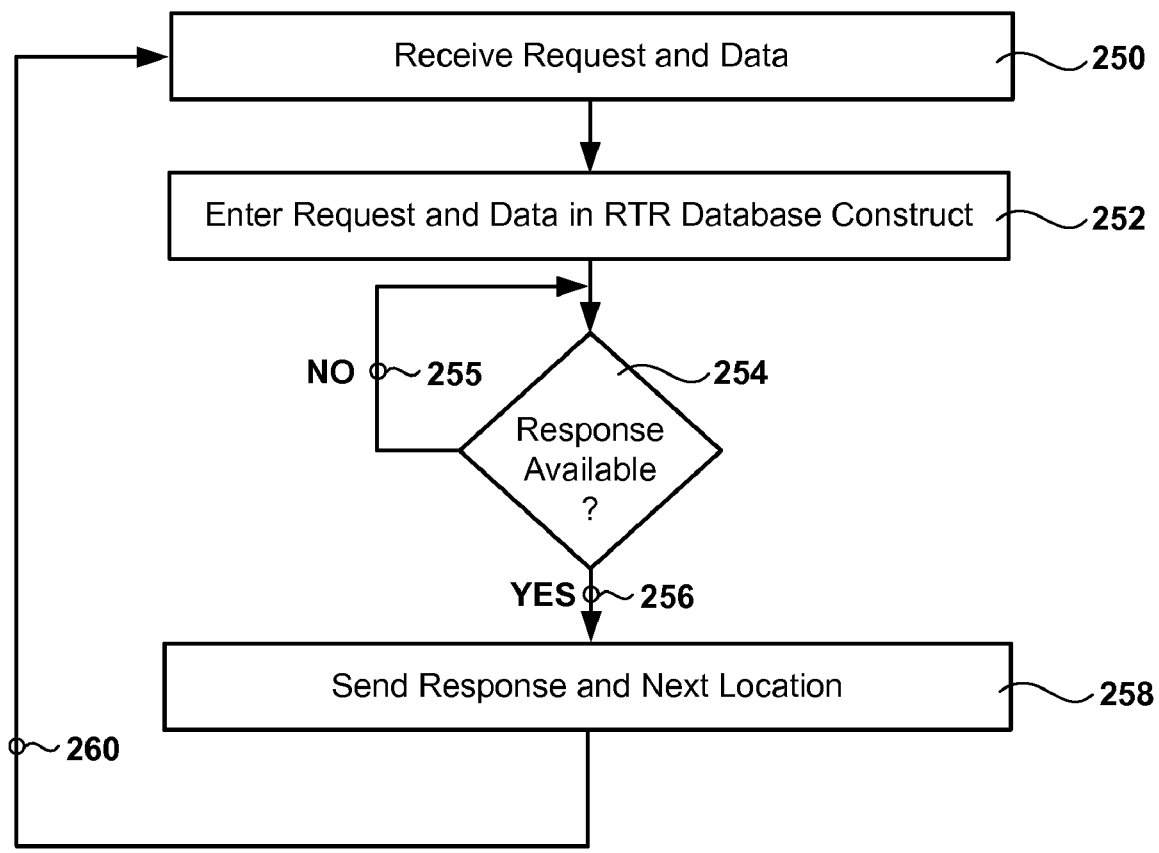
FIG. 11 is chart showing embodiments of the present invention comprising a server system wherein a data request may be sent in a response to an electronic device.

Some embodiments of the present invention may be described in relation to FIG. 11. A server system may receive 250 a request and data from a client device. The server system may enter 252 the request and the data in an RTR database construct. The server system may determine 254 if a response to the request is available. If a response is not available 255, the server system may wait for a response to become available. When a response is available 256, the server system may send 258 the response and the location for a next request to the client device. The server system may then receive additional requests and data from the client device, continuing 260 the request/response cycle. When a request and data are entered 252 into the RTR database construct, the entry may be linked to previous entries in the thread or storyline. The response sent 258 to the client device may comprise instructions for the client device, a data request or other information.

Figure 12:
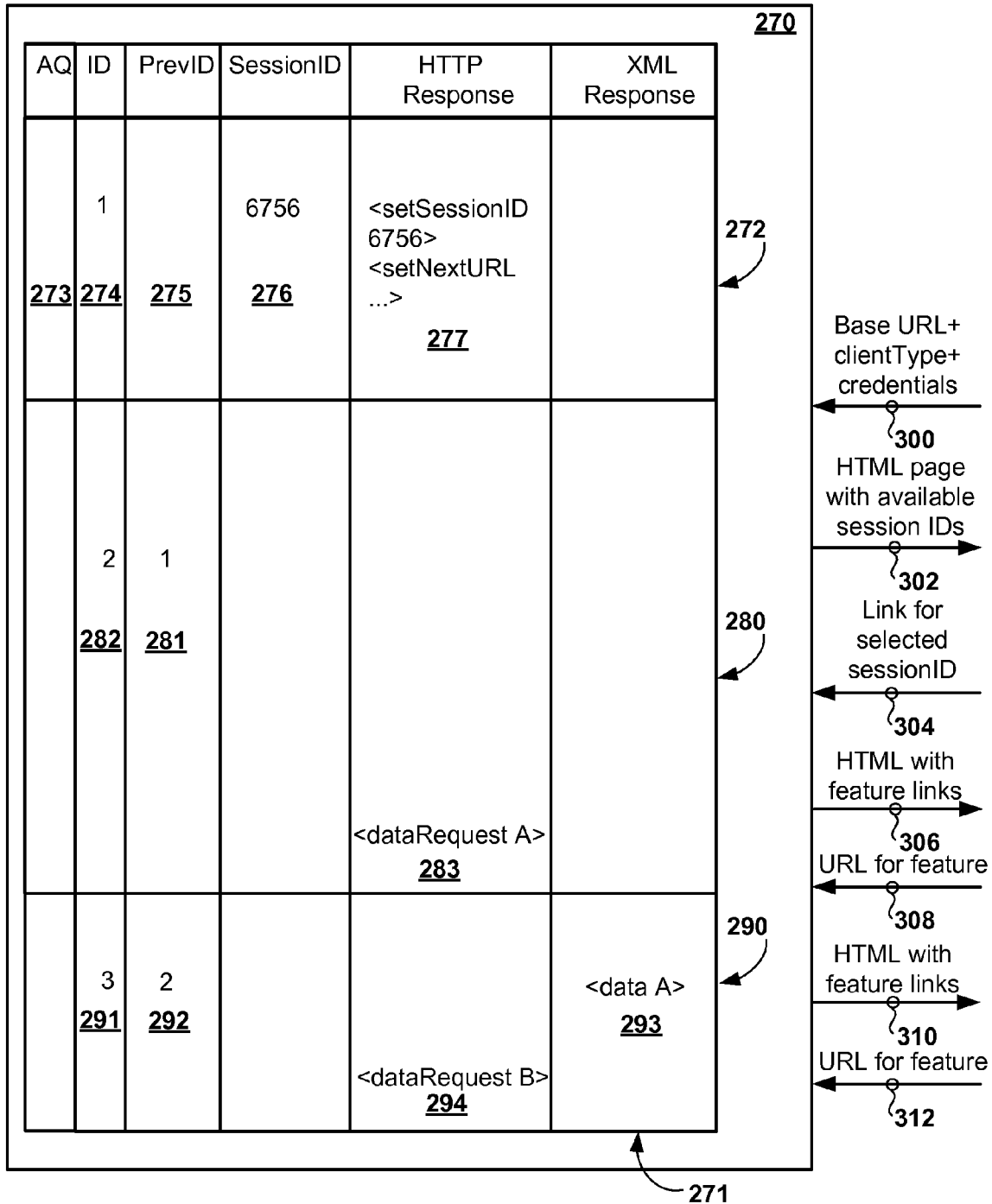
FIG. 12 is a drawing showing an exemplary transaction between a server system and an electronic device.

An exemplary transaction between a first client device and a server system may be described in relation to FIG. 12. In some embodiments of the present invention, a first client device may make a first request 300 to a server system 270 using a base location identifier associated with the server system 270. In some embodiments of the present invention, the base location identifier may comprise a URL. The client credentials and the client type for the first client device may be included in the parameters of the request 300. In some embodiments of the present invention, a runtime parameter may direct the server system 270 to present a login page to the first client device. In alternative embodiments, a runtime parameter may automatically log in any user to an associated user in the database. Based on the client type included as a parameter with the request 300, a default action may be called. In this exemplary transaction, the default action may effectuate the determination of a session identifier (SessionID) 276 for a session related to an available device for which there may be an RTR database construct 271 entry 272 which may indicate that the device is waiting for an HTTP response of which the first client device may provide. In some embodiments, several session identifiers each associated with a client device may be determined. The available session identifiers may be communicated 302 to the first client device from the server system 270. In some embodiments of the present invention, the available session identifiers may be communicated 302 in an HTML page.

A session identifier selected at the first client device may be submitted 304 to the server system. The RTR management logic associated with the RTR database construct 271 associated with the selected session identifier 276 may mark the RTR database construct as acquired (AQ) 273. A URL may be encoded as an "onchange" javascript command with the selected session identifier encoded in the URL. The URL may specify the "DirectAction" class and method to execute. In some embodiments the first client device credentials may be authenticated prior to calling the specified method. A top level graphical user interface for the identified storyline may be sent 306 to the first client device. A link for a feature may specify whether or not the feature requires communication from the device associated with the RTR database construct 271. If communication from the device associated with the RTR database construct 271 is not required, the feature may not effectuate a new RTR database construct 271 entry, and the device associated with the RTR database construct 271 may be unaware of the transaction. The first client device may submit 308 a URL that may specify a "DirectAction" class and method for a feature. The server system may load the class and call the specified action. In some embodiments of the present invention, the first client device credentials may be validated in each such call. If the feature requires information from the device associated with the RTR database construct 271, then the HTTP Response portion 283 of the RTR database construct entry 280 may be populated with the request. The information required may be specified by a special key in the URL.

The RTR management logic may determine the populated field and send the response and the next URL to the device associated with the RTR database construct 271. The requested data 293 may be entered in RTR database construct 271 upon receipt by the client device associated with the RTR database construct 271 and sent 310 to the first client device. The first client device may use the data and request additional data by submitting 312 another URL for a feature and request for information.

Figure 13:
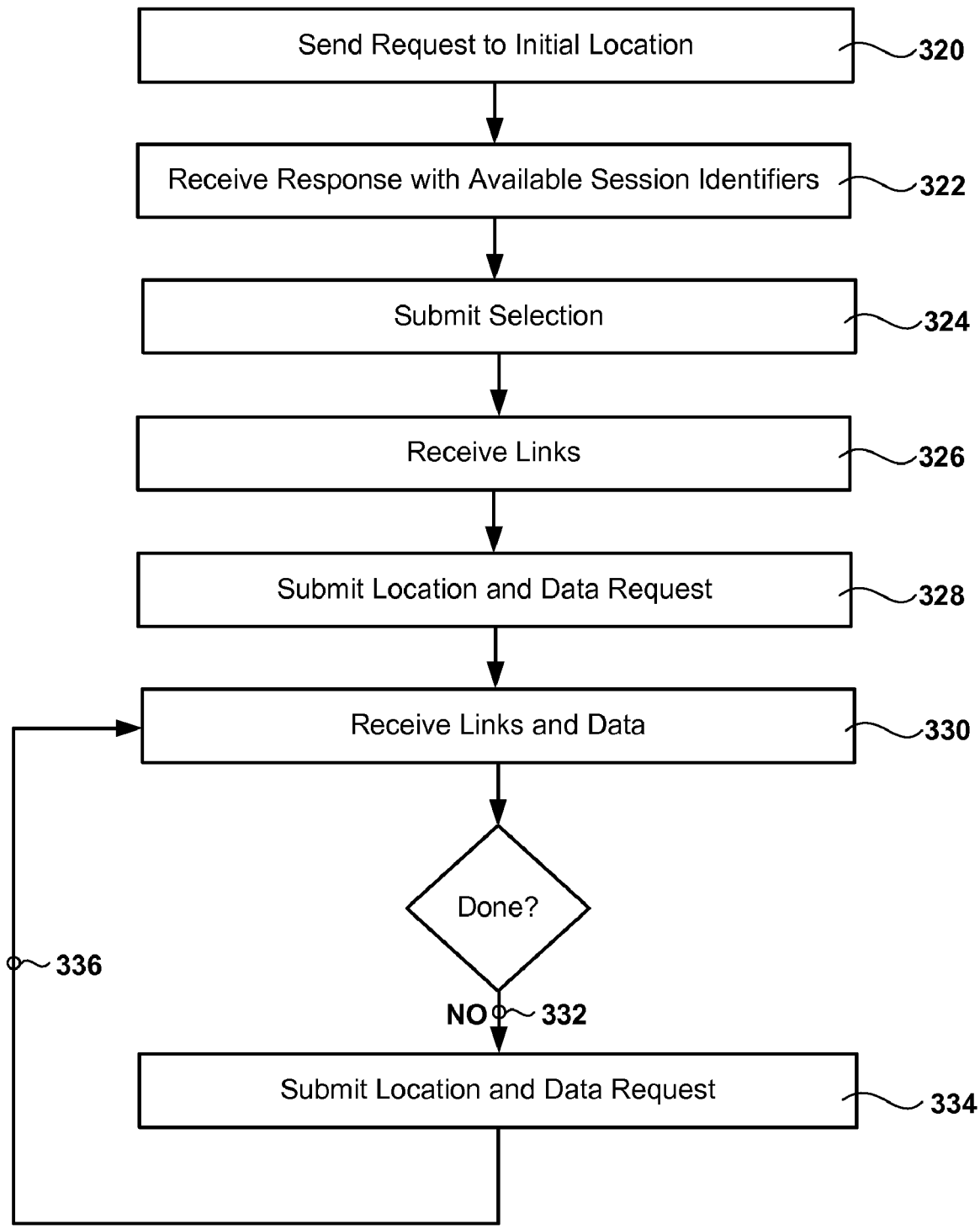
FIG. 13 is a chart showing embodiments of the present invention comprising a transaction between a server system and an electronic device.

Some embodiments of the present invention may be described in relation to FIG. 13. A client device may send 320 a request to an initial location. In some embodiments of the present invention, the initial location may be related to a server system, and the initial location may comprise a base URL associated with the server system. In some embodiments of the present invention, the client credentials and the client type for the first client device may be included in the parameters of the request The client device may receive 322 a response for the server system. The received response may comprise a list of available session identifiers for which the client device may interact. The client device may submit 324 a selected session identifier to the server system. The client device may then receive 326 information containing links to features associated with the selected session identifier. The client device may submit 328 a link related to a desired feature and a data request to the server system. The client device may receive 330 subsequent links and any data received at the server in response to the data request. If additional data is required 332, the client device may submit 334 additional links and data requests, continuing 336 a submit and receive process.

Figure 14:
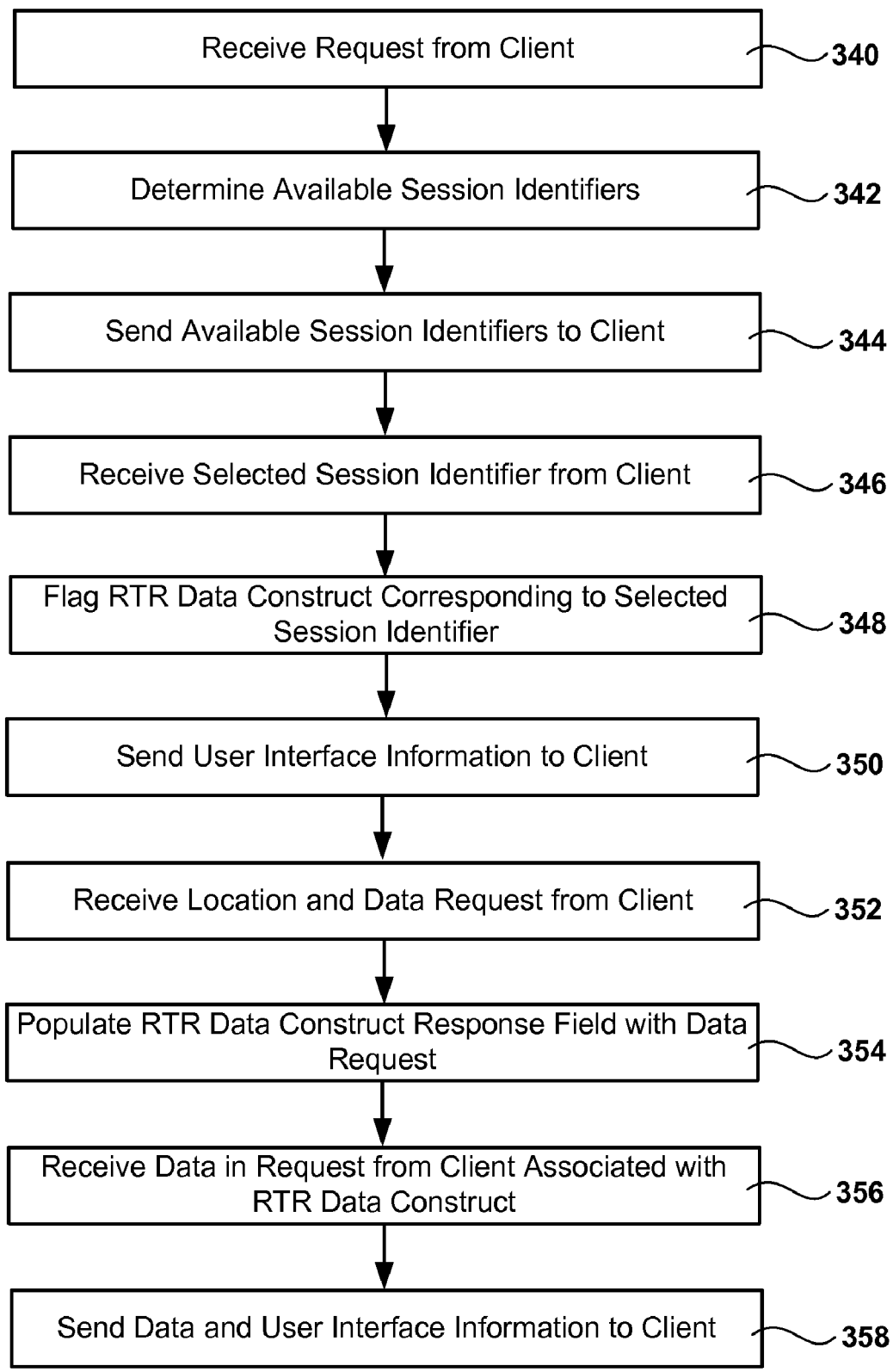
FIG. 14 is a chart showing embodiments of the present invention comprising a transaction between a server system and an electronic device.

Some embodiments of the present invention may be described in relation to FIG. 14. A server system may receive 340 a request from a client device. The server system may then determine 342 the session identifiers for available threads related to the client device request. In some embodiments, the server system may determine 342 the availability by accessing the RTR data constructs associated with connected client devices. The server system may send 344 a list of the available session identifiers to the client device from which the server system received 340 the request. The server system may then receive 346 a selected session identifier from the client device. The server system may then flag 348 the RTR data construct corresponding to the selected session identifier which may prevent other devices from attaching to the thread. The server system may then send 350 user interface information to the client device from which the request was received. The server system may then receive 352 a location for a feature selected by the client device and a data request from the client device. In some embodiments, the location may be a URL for the feature. The server system may populate 354 the response field of the RTR data construct associated with the session identifier selected by the client device with the data request. The server system may receive 356 the requested data from the client associated with the RTR data construct and may send 358 the data and additional user interface data to the client device.

In some embodiments of the present invention, the server system may create HTTP responses by utilizing "WODirectAction." "WODirectActions" may respond to stateless HTTP requests and may build HTTP responses directly by creating a "WOResponse" or by creating and returning a "WOComponent." Since the application may be stateless, the abstract class "ValidatedDirectAction," which may inherit from "WODirectAction," may be used as a base class for the various "DirectAction" classes. In some embodiments, the base URL may not contain references to the "DirectAction" or method and "WebObjects" may automatically assume "DirectAction" class and "defaultAction" method.

In some embodiments of the present invention, when an HTTP request is made, the URL may contain the "DirectAction" class name and method therein that will generate the HTTP response, except for the initial URL, which may omit these fields. When the field are omitted, by default the class "DirectAction" and method "defaultAction" may be called.

In some embodiments of the present invention, when the "DirectAction" class is loaded, the method "performActionNamed" may be called. Some embodiments may execute the method specified in the URL (or "defaultAction" if omitted). In some embodiments, "performActionNamed" may be overridden in "ValidatedDirectAction." In these embodiments, client validation may be performed first, and a concrete instance of "ValidClient" may be obtained before returning the "WOResponse" provided by the specified method. Since the class containing the method "performActionNamed" also may be the class with the method that will be called, "performActionNamed" may assign the "ValidClient" instance to a class variable that may be accessed by the method. The "ValidClient" instance also may refer to a current RTR database construct, which was obtained during authentication.

Some embodiments of the present invention comprise methods and systems for providing device-independent, autonomous features with user sessions that may be portable between devices. In some embodiments of the present invention, a user session may span multiple devices simultaneously. In alternative embodiments of the present invention, user sessions may span multiple devices in sequence.

Some embodiments of the present invention comprise methods and systems for consumer-based information within a session to flow from a first consumer device to a second consumer device without interruption in the session.

Figure 15:
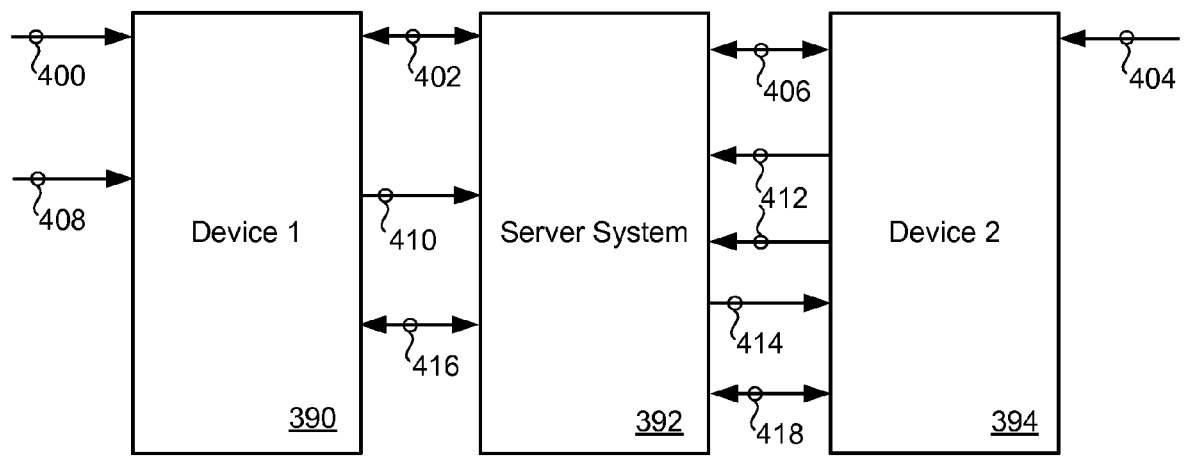
FIG. 15 is a drawing showing embodiments of the present invention comprising a first device, a second device and a server system.

Some embodiments of the present invention may be described in relation to FIG. 15. These embodiments may comprise a first device 390, a server system 392 and a second device 394. In these embodiments, a connection to the server system 392 may be initiated 400 from the first device 390. In some embodiments, a user may use a single button on the first device 390 to initiate 400 the connection. In an exemplary embodiment, the first device 390 may be a television, and connection to the server system 392 may be initiated 400 by a single-button press on the remote control associated with the television. In alternative embodiments, connection to the server system 392 may be initiated 400 when the first device 390 is powered up. In still alternative embodiments, connection to the server system 392 may be initiated 400 by a combination of button presses on the first device 390, by a menu selection from the first device 390 or other methods. The server system 392 may authenticate 402 the device 390, and once authenticated, an updated registration and discovery list of devices available to the first device 390 may be sent 402 to the first device 390. In some embodiments, the discovery list may be based on preferences set by a user. In some embodiments, the server system 392 may authenticate 402 the device 390 based on a device password. In alternative embodiments, the server system 392 may authenticate 402 the device 390 based on a user password.

A connection to the server system 392 may be initiated 404 from the second device 394. In some embodiments, a user may use a single button on the second device 394 to initiate 404 the connection. In an exemplary embodiment, the second device 394 may be a cellular telephone, and connection to the server system 392 may be initiated 404 by a single-button press on the cellular telephone. In alternative embodiments, connection to the server system 392 may be initiated 404 when the second device 394 is powered up. In still alternative embodiments, connection to the server system 392 may be initiated 404 by a combination of button presses on the second device 394, by a menu selection from the second device 394 or other methods. The server system 392 may authenticate 406 the device 394, and once authenticated, an updated registration and discovery list of devices available to the second device 394 may be sent 406 to the second device 394. In some embodiments, the discovery list may be based on preferences set by a user. In some embodiments, the server system 392 may authenticate 406 the device 394 based on a device password. In alternative embodiments, the server system 392 may authenticate 406 the device 394 based on a user password.

The first device 390 may receive 408 input which may be transferred to a device on the discovery list of the first device 390. In an exemplary embodiment, the input may be transferred to the second device 394. In some embodiments of the present invention, a user may select the recipient device for the input. In an exemplary embodiment, the user may select a pseudo name from the discovery list on the first device 390 indicating the recipient for the input. In some embodiments, if the first device 390 and the second device 394 are associated with the same user, the user may select himself as the intended recipient. In alternative embodiments of the present invention, a default recipient device may be the destination. In still alternative embodiments of the present invention, a second device 394 associated with a second user may be selected. In some embodiments of the present invention, the user may select an intended recipient by selecting a pseudo name from a buddy list on the first device 390. In some embodiments, a pseudo name from the buddy list may be associated with multiple devices. In some of these embodiments, if a pseudo name from the buddy list is associated with multiple devices, the destination(s) may be all devices associated with the pseudo name. In alternative embodiments, the destination may be a default device associated with the pseudo name. In still alternative embodiments, the destination(s) may be some of the devices associated with the pseudo name. In some embodiments, the method for determining the destination if a pseudo name is associated with multiple devices may be based on preferences defined by a user.

The first device 390 may send 410 the input and the intended destination(s) to the server system 392 as an RTR message. A second device 394 may periodically request 412 (two requests shown) messages from the server system 392. In an exemplary embodiment in which the message destination is the second device, the server system 392 may look at the RTR message sent 410 by the first device 390 and redirect 414 it to the second device 394. In some embodiments of the present invention, the server system 392 may provide the second device 394 with any transcoders, plug-ins or other required software or information necessary for control and presentation of the input sent from the first device 390. The first device 390 may wait 416 for a next request from a user and may send or receive messages to or from the second device 394. The second device 394 may wait 418 for a next request from a user and may send or receive messages to or from the first device 390.

Figure 16:
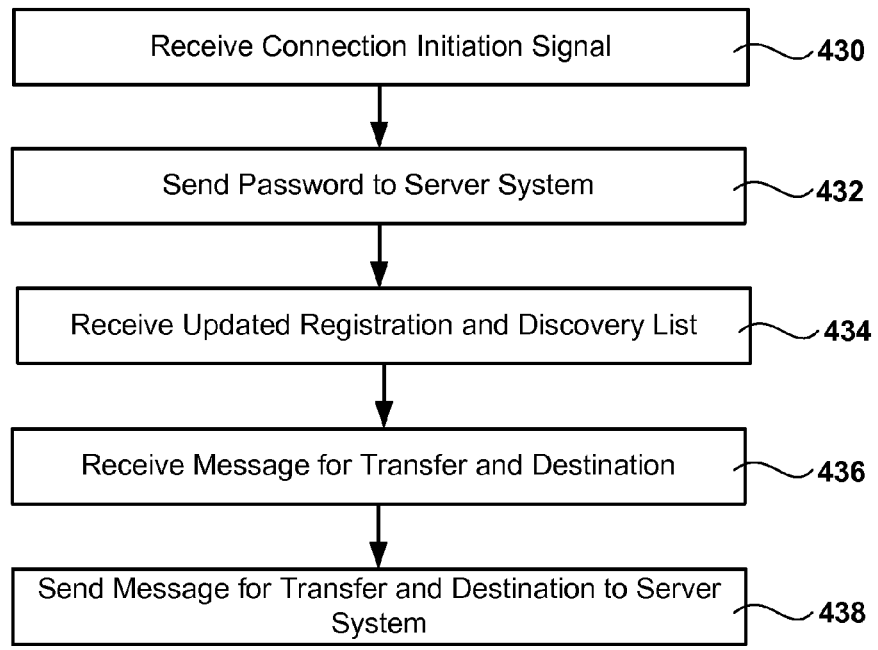
FIG. 16 is a chart showing embodiments of the present invention comprising sending a message from a first device through a server system to a second device.

Some embodiments of the present invention may be described in relation to FIG. 16. In these embodiments, a first device may receive 430 a connection initiation signal. In exemplary embodiments, the connection initiation signal may be generated in response to a single-button push, a combination of button pushes, a menu selection, powering up the device and other methods. The first device may send 432 a password to a server system. The first device may receive 434 from the server system an updated registration and discovery list. In some embodiments, the discovery list may comprise a list of pseudo names for other devices. In alternative embodiments, the discovery list may comprise a buddy list. In still alternative embodiments, the discovery list may be updated based on preferences associated with the first device or a user of the first device or other preferences. The first device may receive 436 a message and a destination indicator which may indicate a destination to which to transfer the message. In some embodiments of the present invention, the message destination may be associated with a device, or devices, on the discovery list. The first device may then send 438 the message and the destination indicator to the server system.

Figure 17:
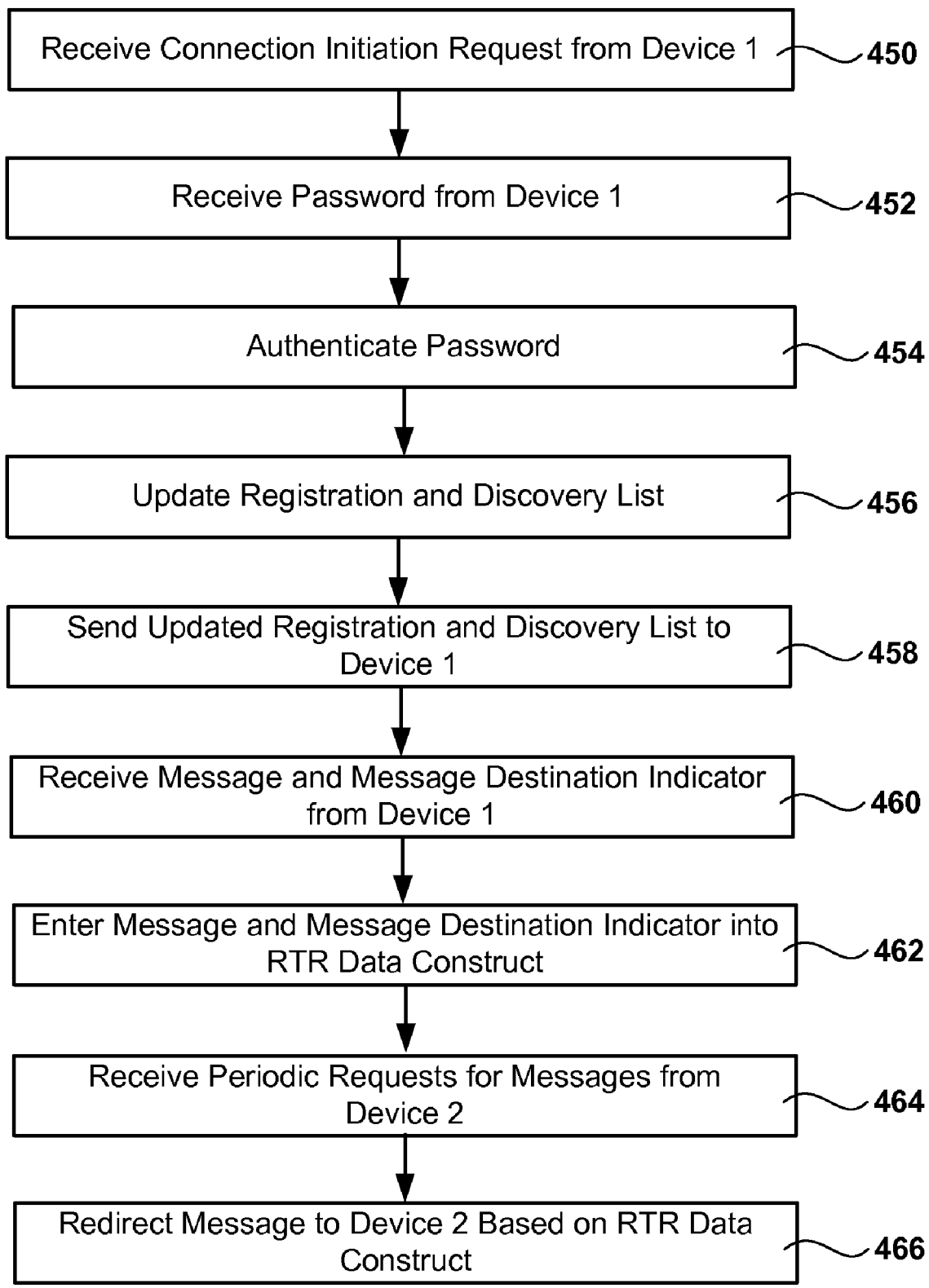
FIG. 17 is a chart showing embodiments of the present invention comprising redirecting a message from a first device to a second device through a server system using an RTR data construct.

Some embodiments of the present system may be described in relation to FIG. 17. A server system may receive 450 a connection initiation request from a first device (device 1). The server system may also receive 452 a password from the first device. In some embodiments of the present invention, the password may be a device password. In alternative embodiments, the password may be a user password. In still alternative embodiments, the password may be associated with a device and a user of the device. After receiving 452 the password from the first device, the server system may authenticate 454 the password. Upon authentication, the server system may update 456 a registration and discovery list associated with the device and/or user. The server system may send 458 the updated registration and discovery list to the first device. The server system may receive 460 a message and a message destination indicator from the first device. The server system may enter 462 the message and message destination indicator as an appropriate entry in an RTR table. The server system may also receive 464 periodic requests for messages from another, second device (device 2). When the second device is an intended recipient of the message as determined by the RTR table, the server system may redirect 466 the message to the second device.

Figure 18:
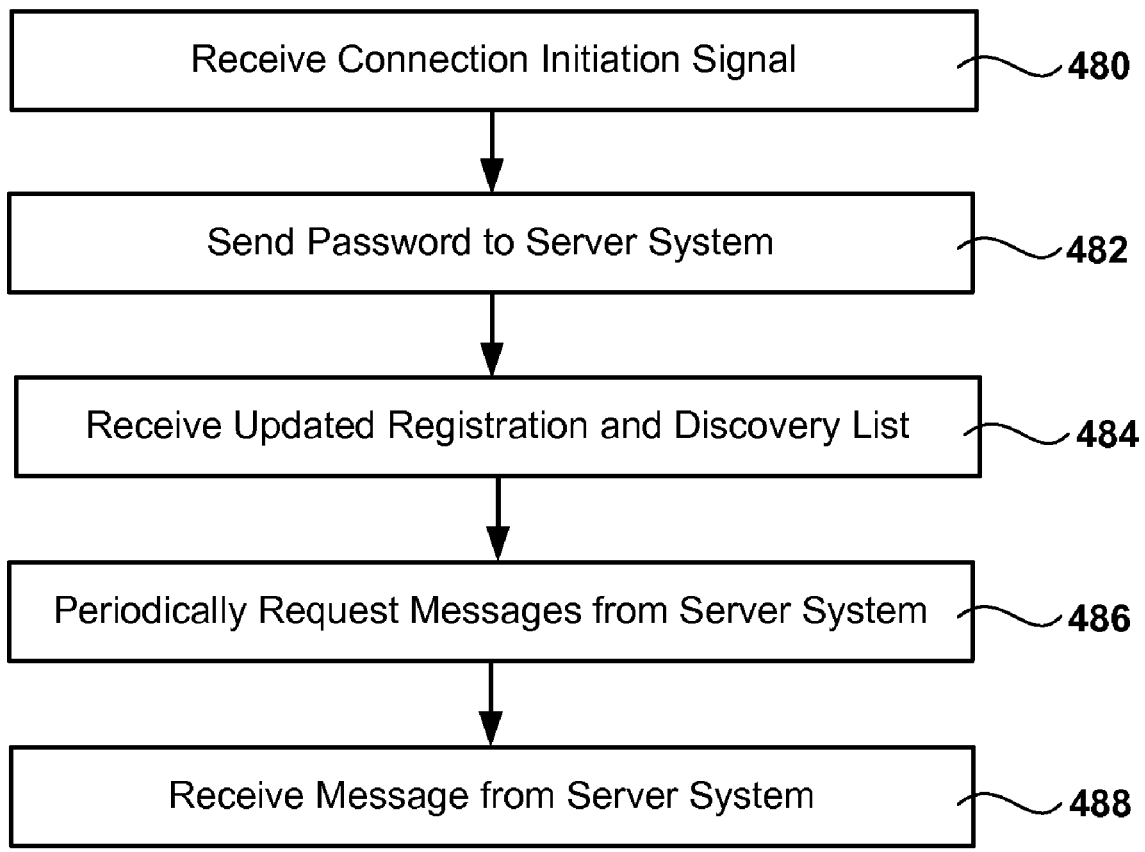
FIG. 18 is a chart showing embodiments of the present invention comprising a device polling a server system.

Some embodiments of the present invention may be described in relation to FIG. 18. A device may receive 480 a connection request signal. In exemplary embodiments, the connection initiation signal may be generated in response to a single-button push, a combination of button pushes, a menu selection, powering up the device and other methods. The device may send 482 a password to a server system. The device may receive 484 from the server system an updated registration and discovery list. In some embodiments, the discovery list may comprise a list of pseudo names for other devices. In alternative embodiments, the discovery list may comprise a buddy list. In still alternative embodiments, the discovery list may be updated based on preferences associated with the device or a user of the device or other preferences. The device may periodically poll 486 the server system for messages. The device may receive 488 a message from the server system.

In some embodiments of the present invention, the server system may maintain association between the first device and the second device through an RTR table as described above.

Figure 19:
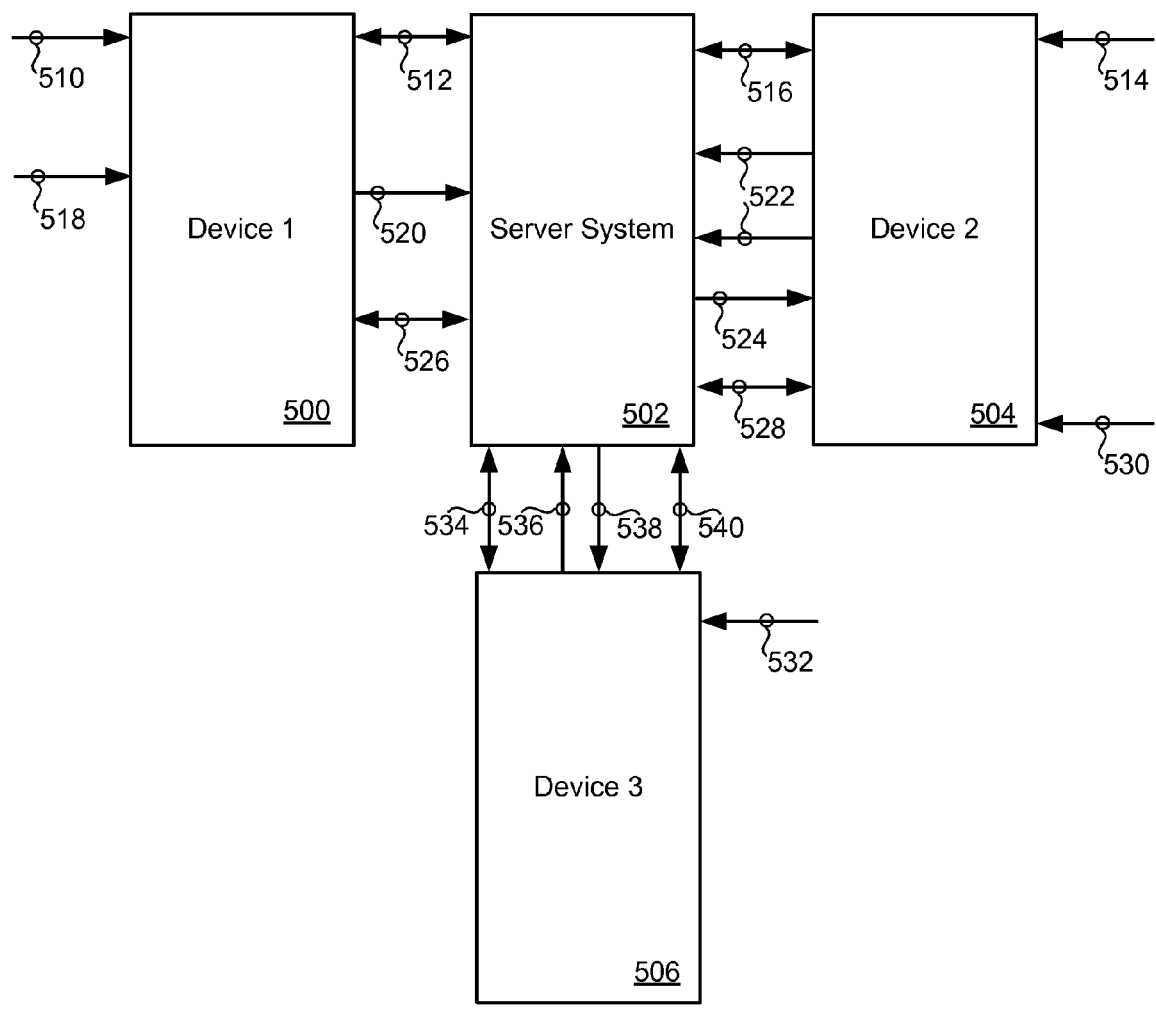
FIG. 19 is a drawing showing embodiments of the present invention comprising a plurality of devices and a server system.

Some embodiments of the present invention may be described in relation to FIG. 19. These embodiments may comprise a first device 500, a server system 502, a second device 504 and a third device 506. In these embodiments, a connection to the server system 502 may be initiated 510 from the first device 500. In some embodiments, a user may use a single button on the first device 500 to initiate 510 the connection. In an exemplary embodiment, the first device 500 may be a television, and connection to the server system 502 may be initiated 510 by a single-button press on the remote control associated with the television. In alternative embodiments, connection to the server system 502 may be initiated 510 when the first device 500 is powered up. In still alternative embodiments, connection to the server system 502 may be initiated 510 by a combination of button presses on the first device 500, by a menu selection from the first device 500 or other methods. The server system 502 may authenticate 512 the device 500, and once authenticated, an updated registration and discovery list of devices available to the first device 500 may be sent 512 to the first device 500. In some embodiments, the discovery list may be based on preferences set by a user. In some embodiments, the server system 502 may authenticate 512 the device 500 based on a device password. In alternative embodiments, the server system 502 may authenticate 512 the device 500 based on a user password.

A connection to the server system 502 may be initiated 514 from the second device 504. In some embodiments, a user may use a single button on the second device 504 to initiate 514 the connection. In an exemplary embodiment, the second device 504 may be a television, and connection to the server system 502 may be initiated 514 by a single-button press on the remote control associated with the television. In alternative embodiments, connection to the server system 502 may be initiated 514 when the second device 504 is powered up. In still alternative embodiments, connection to the server system 502 may be initiated 514 by a combination of button presses on the second device 504, by a menu selection from the second device 504 or other methods. The server system 502 may authenticate 516 the device 504, and once authenticated, an updated registration and discovery list of devices available to the second device 504 may be sent 516 to the second device 504. In some embodiments, the discovery list may be based on preferences set by a user. In some embodiments, the server system 502 may authenticate 516 the device 504 based on a device password. In alternative embodiments, the server system 502 may authenticate 516 the device 504 based on a user password.

The first device 500 may receive 518 input which may be transferred to a device on the discovery list of the first device 500. In this exemplary embodiment, the input may be transferred to the second device 504. In some embodiments of the present invention, a user may select the recipient device for the input. In some embodiments of the present invention, the user may select a pseudo name from the discovery list on the first device 500 indicating the recipient for the input. In alternative embodiments of the present invention, a default recipient device may be the destination. In some embodiments of the present invention, the user may select an intended recipient by selecting a pseudo name from a buddy list on the first device 500. In some embodiments, a pseudo name from the buddy list may be associated with multiple devices. In some of these embodiments, if a pseudo name from the buddy list is associated with multiple devices, the destination(s) may be all devices associated with the pseudo name. In alternative embodiments, the destination may be a default device associated with the pseudo name. In still alternative embodiments, the destination(s) may be some of the devices associated with the pseudo name. In some embodiments, the method for determining the destination if a pseudo name is associated with multiple devices may be based on preferences defined by a user.

The first device 500 may send 520 the input and the intended destination(s) to the server system 502 as an RTR message. A second device 504 may periodically request 522 (two requests shown) messages from the server system 502. In this exemplary embodiment in which the message destination is the second device, the server system 502 may look at the RTR message sent 520 by the first device 500 and redirect 524 it to the second device 504. In some embodiments of the present invention, the server system 502 may provide the second device 504 with any transcoders, plug-ins or other required software or information necessary for control and presentation of the input sent from the first device 500. The first device 500 may wait 526 for a next request from a user and may send or receive messages to or from the second device 504. The second device 504 may wait 528 for a next request from a user and may send or receive messages to or from the first device 500.

A device may be disconnected from the current session. For example, the second device 504 may be powered down 530, thereby disconnecting the current session from the server system 502. When the user may initiate 532 a connection request through a third device 506, the server system 502 may authenticate 534 the user with his password. Once authenticated, the registration and discovery list for the third device 506 may be updated 534. The third device 506 may periodically poll (one shown) 536 the server system 502 for messages. The server system 502 may associate the user on the third device 506 with the session from the second device 504 through the RTR mechanism, and the session may continue using the third device 506 and the first device 500. The server system 502 may deliver a message 538 to the third device 506. The server system 502 may also provide the third device 506 with any transcoders, plug-ins or other requirements for control and presentation of the delivered message. The third device 506 may wait 540 for a next request from a user and may send or receive messages to or from the first device 500.

Some embodiments of the present invention described herein provide session synchronization between multiple devices through the creation of a database construct (e.g., an RTR table) which stores self-contained requests for all devices and applications. Entries in the database construct may be based on synchronized response trips for communicating devices, thereby providing device independence allowing user sessions that may span multiple devices at the same time or in sequence.

Figure 20:
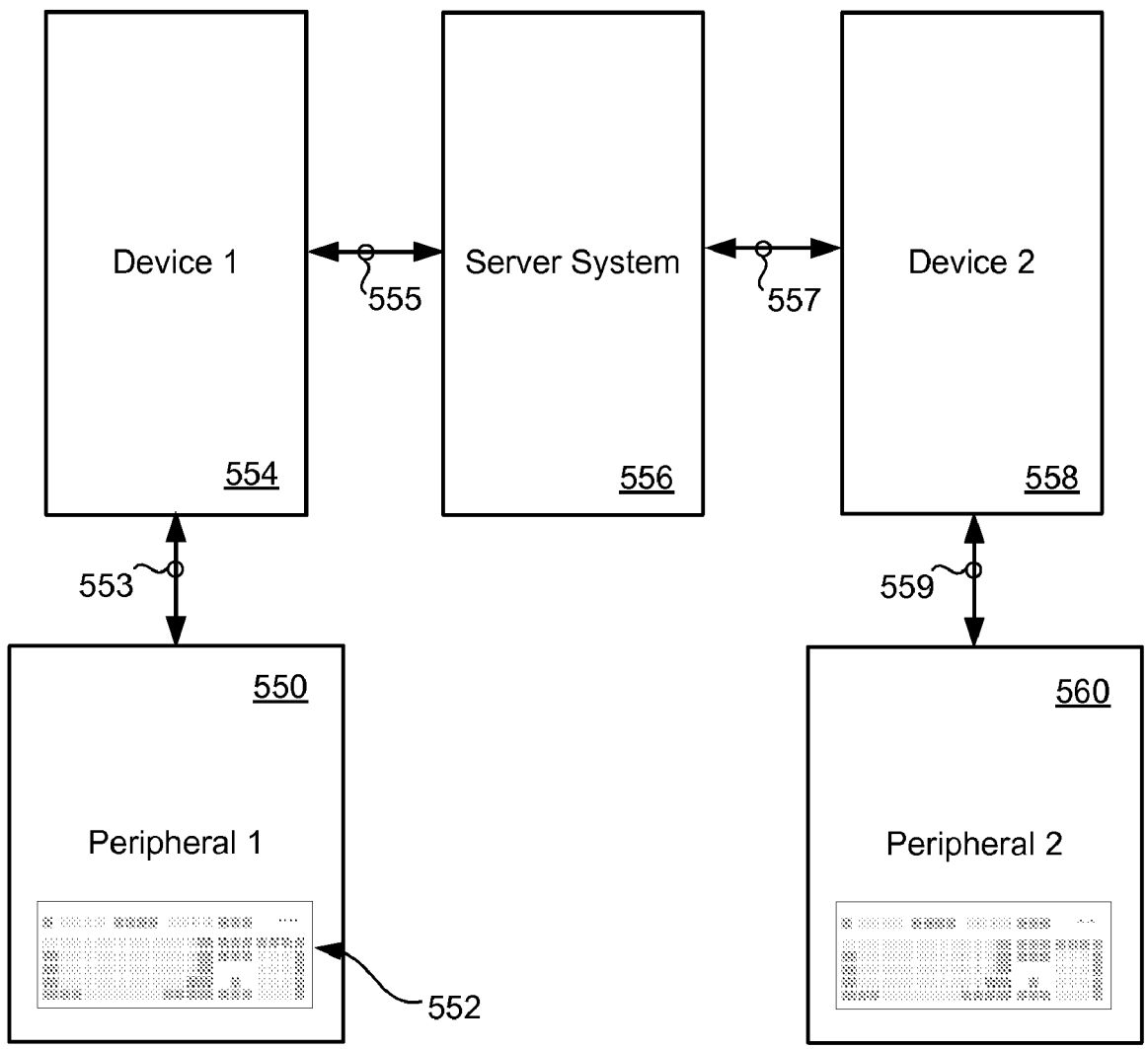
FIG. 20 is drawing showing embodiments of the present invention comprising a first peripheral device in communication with a first device.

Some embodiments of the present invention may be described in relation to FIG. 20. In these embodiments, a first peripheral device 550, which may comprise an input/output (I/O) interface 552, may be used as an interface for communicating to a first device 554. The first peripheral device 550 and the first device 554 may be communicatively coupled 553 by a wired, wireless or other connection. The first device 554 may be connected 555 to a server system 556 by a wired, wireless or other connection. A second device 558 may be connected 557 to the server system 556 by a wired, wireless or other connection. A second peripheral device 560 may be used as an interface to the second device 558. The second peripheral device 560 and the second device 558 may be communicatively coupled 559 by a wired, wireless or other connection. Exemplary devices may include televisions and other media-playing devices. Exemplary peripheral devices may include PDAs, handheld gaming devices, other personal handheld devices and other peripheral devices. In some embodiments of the present invention, content may be shared between the first device 554 and the second device 558.

In some embodiments, the server system 556 may comprise a stateless application which may route a request to an application or device 554, 558 at any instance of time. In some embodiments of the present invention, this may be accomplished, as described above, using an RTR table at the server system 556. In some embodiments, the RTR table may store self-contained requests for all devices 554, 558 and applications. In these embodiments, the stateless application may build the RTR table based on synchronized request—response trips for communicating devices, also considered clients.

In some embodiments, the server system 556 may comprise device and owner (or user) registration processes. In some embodiments, explicit user registration and implicit device information may be used by the server system 556 to control message flow between two communicating devices.

In some embodiments of the present invention, the server system 556 may not require a device password from a device 554, 558 for connection to the server system 556. In these embodiments, server system security and authentication may use a consumer, or user, password for connection to the server system 556. The user password may be used by a user to identify himself to the server system 556 on any device. In some of these embodiments, a device 554, 558 may be automatically registered to the server system 556 upon user registration from the device 554, 558.

In some embodiments of the present invention, the server system 556 may dynamically associate devices 554, 558 with user preferences.

In some embodiments of the present invention, device and device owner information may be used at the server system 556 to determine message ownership. In these embodiments, the RTR table may store this information in every transaction which may be used by the server system 556 to direct message to the correct owner without interrupting his communication session. A message may be tagged for a device 554, 558 as well as for a user which may allow a message to follow a specific user or a specific device.

In some embodiments of the present invention, a user may be allowed to have a pseudo name associated with himself. The pseudo name may allow other users to share information with this user. In some embodiments, the server system 556 may dynamically populate a list of devices associated with a user. As devices 554, 558 are authenticated based on the user password, a server system application may populate a list of devices available for other users. The server system 556 may read device details for a device from the device 554, 558, and the server system 556 may make these details available to other users to whom the device 554, 558 may be available. In some embodiments of the present invention, the list of devices may be very large, and a list mechanism may be available for users to build a preference list from the larger list. In some embodiments, the list mechanism may be based on pseudo names. In some embodiments, the list mechanism may allow formation of interest groups. In some of these embodiments, the interest group may be based on television viewing habits.

In some embodiments of the present invention, each device 554, 558 may comprise unique control and presentation mechanisms. In some embodiments of the present invention, the server system 556 may inform a device 554, 558 of transcoders, plug-ins or other requirements for understanding the control and presentation of a message from the server system 556. In some embodiments, the message from the server system 556 may originate from another device 554, 558. In some embodiments of the present invention, the server system 556 may download device specific transcoders, plug-ins or other requirements to a device 554, 558.

In some embodiments of the present invention, the server system 556 may be share aware allowing two or more devices 554, 558 connected to the server system 556 to share content. In some embodiments, the server system 556 may comprise applications for categorizing devices and/or users. In some of these embodiments, the categories may be based on data mined from consumer devices.

In some embodiments of the present invention, the server system 556 may provide a real-time web-log tool to users. In these embodiments, a user may write, view, discuss or otherwise comment on a topic associated with the web-log. In some embodiments, the tool may be linked to a client device based on content being consumed on the client device 554, 558.

In some embodiments of the present invention, a device 554, 558 may be connected to the server system 556 and a peripheral device 550, 560. A device 554, 558 may comprise a remote server client and a peripheral device client. A device 554, 558 may further comprise software which may permit external systems to access APIs internal to the device 554, 558. In these embodiments, a client server task may communicate with the remote server system 556 by sending and receiving data specific to the device 554, 558. In some embodiments, this communication exchange may be performed using a secure internet protocol, for example over HTTP using XMLRPC using SSL with standard authentication procedures. The client peripheral task in these embodiments may communicate with external peripheral devices 550, 560 to send and receive data directly. In some embodiments, communication between a device 554, 558 and a peripheral device 550, 560 may be wired communication. In alternative embodiments, communication may be wireless. Some embodiments may comprise a smart peripheral client which may determine if a server system 556 request task may be performed on the device 554, 558 or if the request should be forwarded to the peripheral device 550, 560. In some embodiments, the client peripheral task may uses the peripheral device to perform various functions. Exemplary function may include key input, visual display, computation and other functions. In some embodiments, functions may be split between the device and the peripheral.

Figure 21:
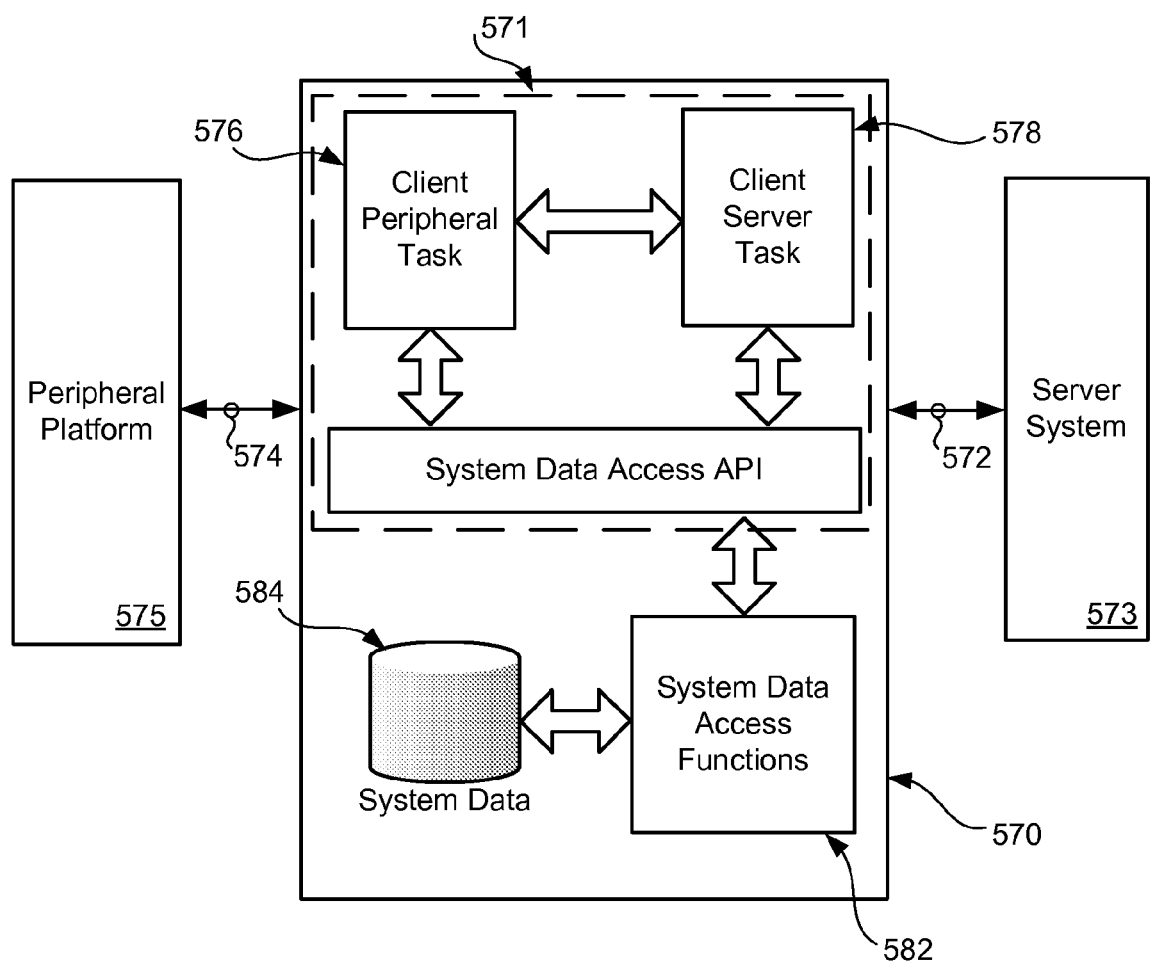
FIG. 21 is drawing showing embodiments of the present invention comprising a device platform which comprises a client peripheral task and a client server task.

In some embodiments of the present invention shown in FIG. 21, a device 570 comprising a device platform 571 may be connected 572 to a server system 573 by a wired, wireless or other connection. The device 570 may also be connected 574 to a peripheral platform 575 by a wired, wireless or other connection. The device platform 571 may comprise a client peripheral task 576 and a client server task 578. The client server task 578 may communicate with the server system 572. The client peripheral task 576 may communicate with the peripheral platform 574. The device platform 571 may further comprise a system data access API 580. Both the client peripheral task 576 and the client server task 578 may communicate with the system data access API 580, which may access system data 584 through system data access functions 582.

In an exemplary embodiment, a first device may be a television or other content viewing device. The television platform may be used in conjunction with a peripheral device to share messages through a server system with other devices. In this exemplary embodiment, key input may be accepted at the television platform from the peripheral device, the key input may be sent to the server system from the television platform, and display information may be displayed on either the television platform or the peripheral platform or both.

In some embodiments of the present invention, the device platform 571 may be used to develop a user experience for web-log and community sharing. An application running on the device platform 571 may provide a recommendation to the user to become part of a group, may allow the user to become part of the group and may provide search and presentation mechanisms to link to web-logs of interest. In some embodiments, the links may be determined based on consumer activity on the device platform 571 or elsewhere. In some embodiments, the device platform 571 may allow a user to expose preferences to other users connected to the server system 573. In alternative embodiments, the device platform 571 may allow a user to expose usage habits to other users connected to the server system 573.

Figure 22:
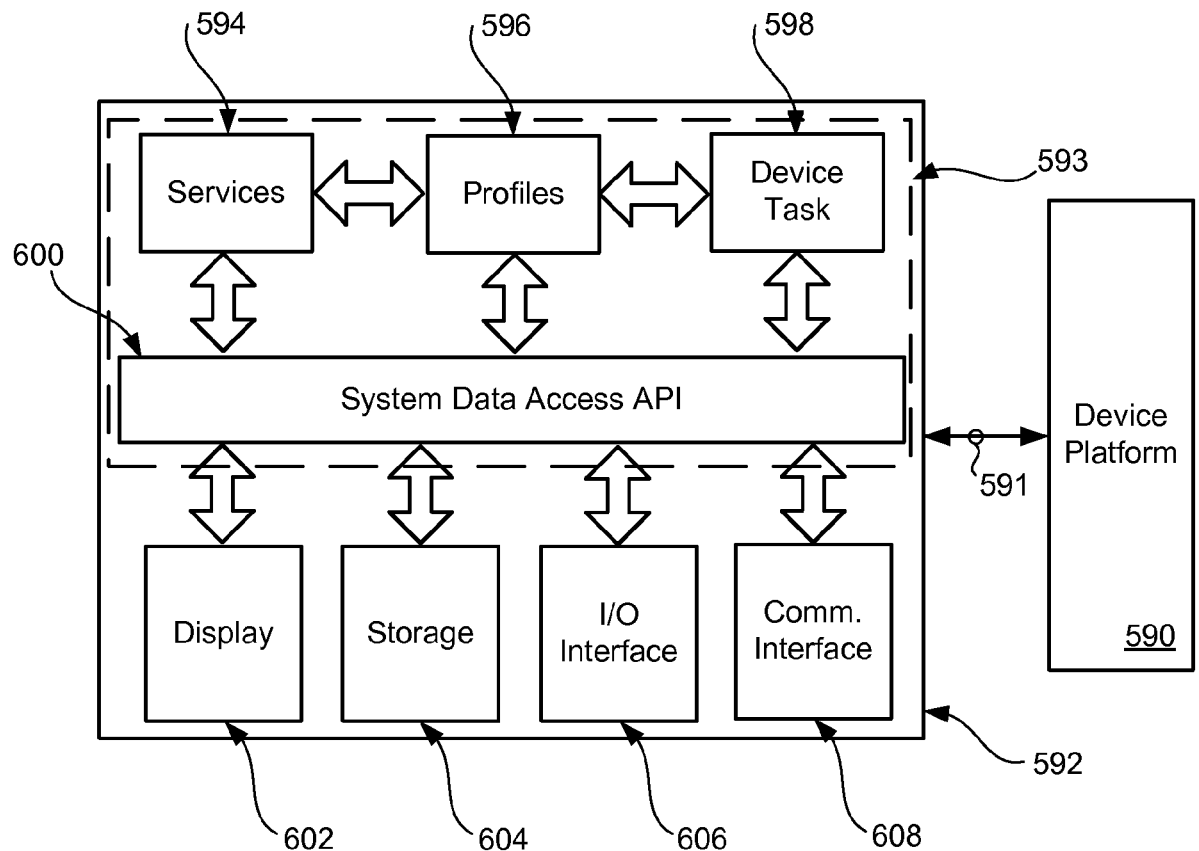
FIG. 22 is a drawing showing embodiments of the present invention comprising a peripheral platform for communicating with a device.

In some embodiments of the present invention shown in FIG. 22, a device platform 590 may be connected 591 to a peripheral 592 comprising a peripheral platform 593 by a wired, wireless or other connection. The peripheral platform 593 may communicate with the device platform 590. In some embodiments, the peripheral platform 593 may assist the device platform 590 in display and I/O functions. In some embodiments (not shown), the peripheral platform may comprise a dumb terminal which captures key input from a user and redirects the input to the device using the device interface. In the embodiments in which the peripheral platform may comprise a dumb terminal, the peripheral platform may further accept messages from the device platform and display them on the peripheral platform. In alternative embodiments, the peripheral platform 593 may be an intelligent device which comprises services 594 and profiles 598 which may enhance interaction capabilities between the peripheral platform 593 and the device platform 590. The peripheral platform 593 may comprise a system data access API 600 which may communicate with the peripheral display 602, the peripheral storage 604, the peripheral I/O 606 and the peripheral communication interface 608. The peripheral platform 593 may further comprise a device task 598 which manages communication with the device platform 590.

In some embodiments, the peripheral platform 593 may expand its capabilities by accessing, storing or collaborating with external services. Exemplary external services include those provided by an electronic program guide and other services.

In some embodiments, the peripheral platform 593 may provide interaction with a web-log based on device activity.

Figure 23:
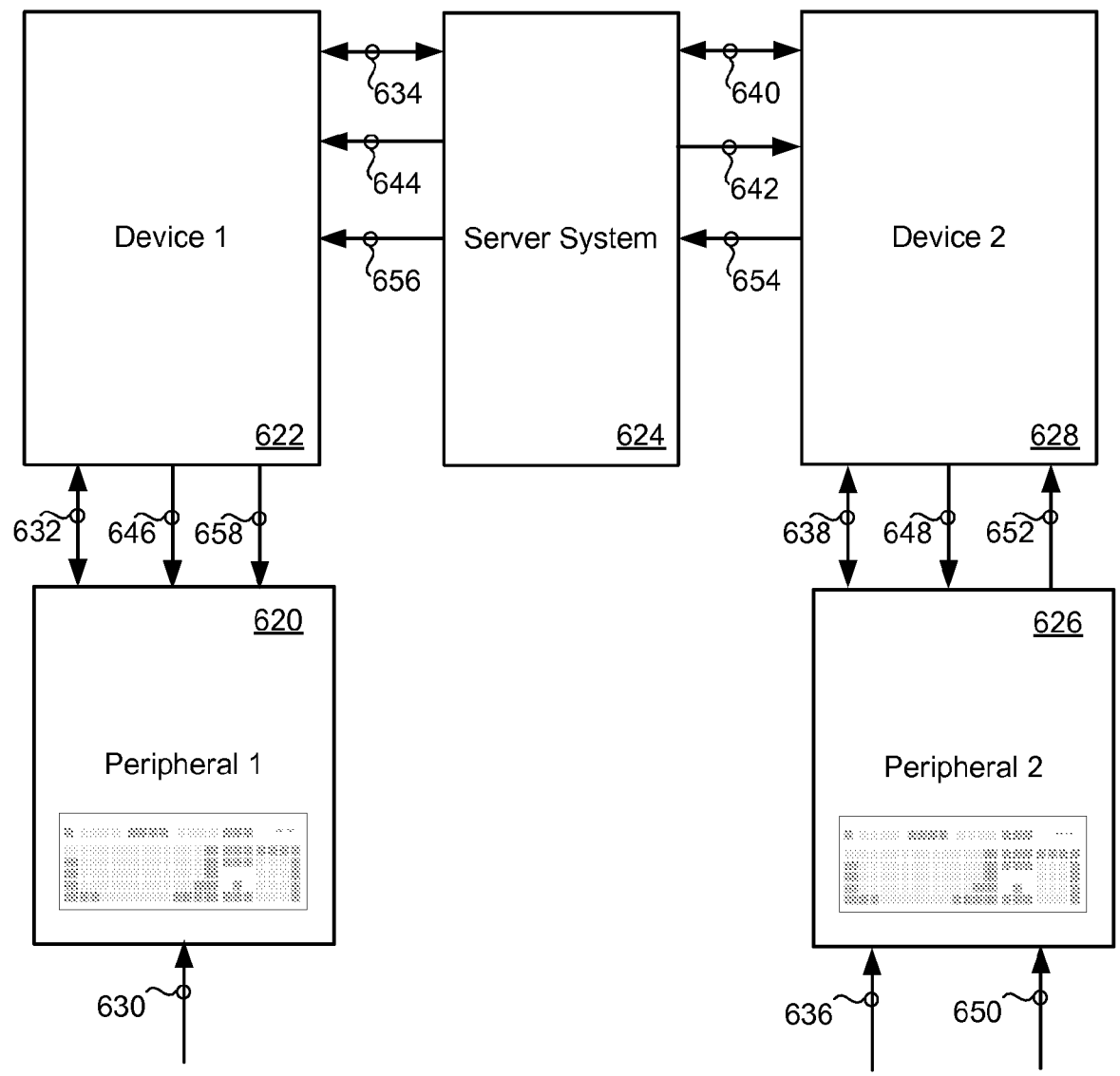
FIG. 23 is a drawing showing embodiments of the present invention comprising a plurality of devices, a plurality of peripheral devices and a server system.

Some embodiments of the present invention may be described in relation to FIG. 23. These embodiments may comprise a first device 622, a second device 628, a server system 624, a first peripheral device 620 and a second peripheral device 626. The first device 622 may be connected by a wired, wireless or other connection to the server system 624. The first device 622 may be further connected by a wired, wireless or other connection to the first peripheral device 620. The second device 628 may be connected by a wired, wireless or other connection to the server system 624. The second device 628 may be further connected to the second peripheral device 626 by a wired, wireless or other connection. In an exemplary embodiment, the first device 622 and the second device 628 may be televisions.

The first peripheral device 620 may receive through interface software a session initiation signal 630 to initiate a connection and sharing session from the first device 622. The first peripheral device 620 and the first device 622 may authenticate 632 each other. Upon authentication 632, the first device 622 may initiate 634 a remote connection with the server system 624. The first device 622 and the server system 624 may authenticate each other and create a communication link as part of the initiation 634 of the remote connection. In some embodiments, the communication link may be a secure communication link.

The second peripheral device 626 may receive through interface software a session initiation signal 636 to initiate a connection and sharing session from the second device 628. The second peripheral device 626 and the second device 628 may authenticate 638 each other. Upon authentication 638, the second device 628 may initiate 640 a remote connection with the server system 624. The second device 628 and the server system 624 may authenticate each other and create a communication link as part of the initiation 640 of the remote connection. In some embodiments, the communication link may be a secure communication link.

When a device 622, 628 successfully connects to the server system 624, the server system discovery list may be updated to include the successfully connected device.

In some embodiments, the server system 624 may send an initial discovery list to a device during connection initiation. In some embodiments, the initial discovery list sent to a particular device may comprise all devices connected to the server system 624 when the particular device initially connects to the server system 624. In alternative embodiments, the initial discovery list sent to a particular device may comprise devices connected to the server system 624 according to preferences set by the particular device. In still alternative embodiments, the initial discovery list sent to a particular device may comprise devices connected to the server system 624 associated with users according to preferences set by the particular device.

In some embodiments of the present invention, an updated discovery list may be sent from the server system 624 to a device when another device successfully connects to the server system 624. In the embodiments described in relation to FIG. 23, when the second device 628 connects to the server system 624, an updated discovery list may be sent 644 to the first device 622, and when the first device 622 connects to the server system 624, an updated discover list may be sent 642 to the second device 628. In some embodiments of the present invention, the updated discovery list may be sent according to the preferences of the device.

In some embodiments of the present invention, an updated discovery list received by a device may be sent from the device to the associated peripheral device. In the embodiments described in relation to FIG. 23, the updated discovery list sent 644 to the first device 622 may be sent 646 from the first device 622 to the first peripheral device 620. The updated discovery list sent 642 to the second device 628 may be sent 648 from the second device 628 to the second peripheral device 626.

The second peripheral device 626 may receive 650 input and an intended-recipient indicator indicating the intended recipient for the input. In some embodiments, the input may comprise a message. The intended recipient may be selected from the discovery list at the second peripheral device 626. The intended-recipient indicator may be a device name, a user name, a pseudo name or other indicator. The second peripheral device 626 may send 652 the input and the intended-recipient indicator to the second device 628. The second device 628 may send 654 the input and the intended-recipient indicator to the server system 624. The server system 624 may examine the input and intended-recipient indicator and forward the input to the intended recipient by an appropriate entry into the RTR table. In the embodiments described in relation to FIG. 23, if the intended recipient is the first device 622, the server system 624 may send 656 the input to the first device 622. In some embodiments, the input may be displayed or otherwise output on the first device 622. In some embodiments, the first device 622 may send 658 the input to the first peripheral device 620 for display or other output on the first peripheral device 620. In some embodiments, the output may be based on preferences.

In some embodiments of the present invention, a peripheral device may send all received input to an associated device. In alternative embodiments, a peripheral device may send select input to an associated device. In further alternative embodiments, a peripheral device may filter or otherwise process input before sending the processed input to an associated device.

In some embodiments of the present invention, multiple peripheral devices may be associated with a first device. In these embodiments, the device platform may support multiple sharing sessions.

Figure 24:
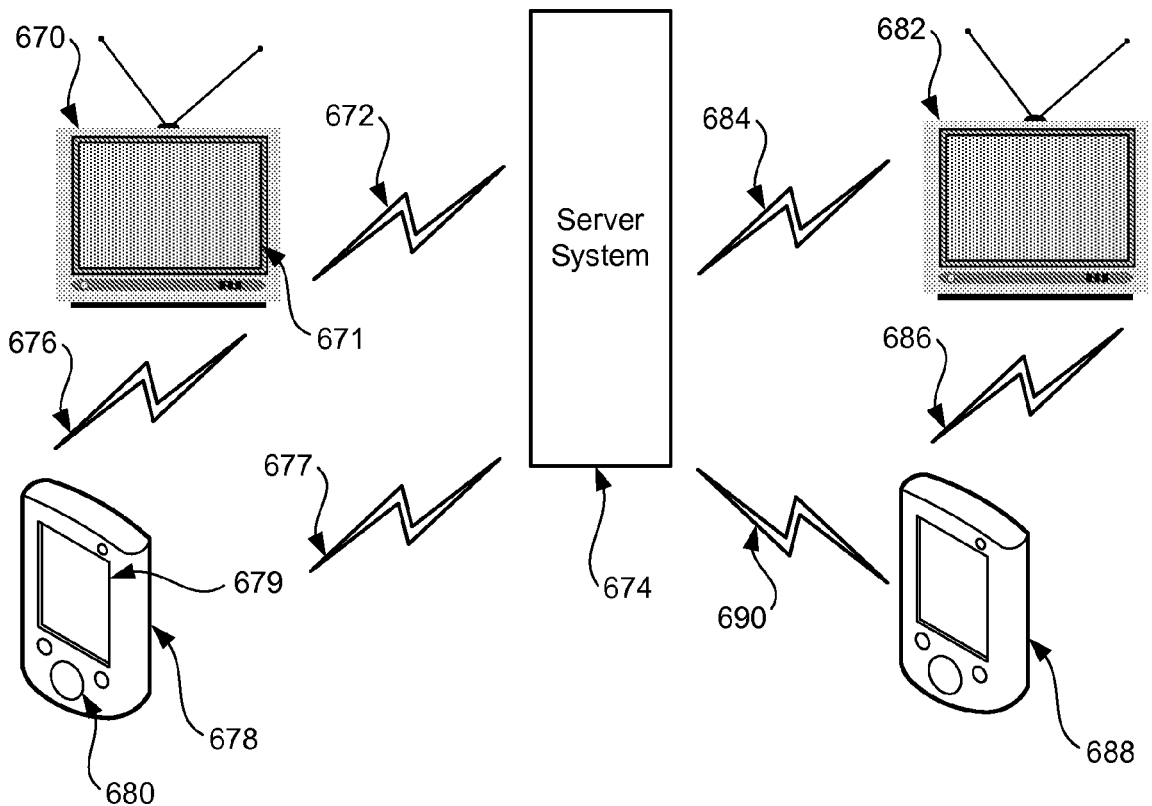
FIG. 24 is a drawing showing embodiments of the present invention comprising content-consumption devices, peripheral devices and a server system.

Some embodiments of the present invention may be described in relation to FIG. 24. These embodiments may comprise a first content-consumption device 670 on which video, audio or other content may be consumed by a user. Exemplary content-consumption devices may include televisions, music players and other devices. In some embodiments, the first content-consumption device 670 may comprise a display 671. The first content-consumption device 670 may be communicatively coupled 672 to a server system 674. The connection 672 between the first content-consumption device 670 and the server system 674 may be a wired, wireless or other connection. In some embodiments of the present invention, the first content-consumption device 670 may be by communicatively coupled 676 to a first peripheral device 678. Exemplary peripheral devices may include handheld devices, gaming devices, personal digital assistants (PDAs) and other peripheral devices. In some embodiments of the present invention, the first peripheral device 678 may comprise a display 679. In some embodiments, the first peripheral device 678 may comprise a user interface 680 for obtaining user input. Exemplary user interfaces may include buttons, a keyboard, a scroll wheel or other user interfaces. The connection 676 between the first peripheral device 678 and the first content-consumption device 670 may be a wired, wireless or other connection.

These embodiments may further comprise a second content-consumption device 682. The second content-consumption device 682 may be communicatively coupled 684 to the server system 674. The connection 684 between the second content-consumption device 682 and the server system 674 may be a wired, wireless or other connection. In some embodiments of the present invention, the second content-consumption device 682 may be communicatively coupled 686 to a second peripheral device 688. The connection 686 between the second content-consumption device 682 and the second peripheral device 688 may be a wired, wireless or other connection.

In some embodiments of the present invention, a content-consumption device 670, 682 may connect to the server system 674 when the content-consumption device 670, 682 powers on. In alternative embodiments, a content-consumption device 670, 682 may connect to the server system 674 in response to a connection initiation request received at the content-consumption device 670, 682. In some of these embodiments, the connection initiation request may be sent to the content-consumption device 670, 682 from a peripheral device 678, 688. In alternative embodiments, the connection initiation request may be sent to the content-consumption device 670, 682 from a remote control associated with the content-consumption device 670, 682. In still alternative embodiments, the connection initiation request may be made directly at the content-consumption device 670, 682 from a user interface (e.g., a button or other input method) integral to the content-consumption device 670, 682.

In some embodiments of the present invention, the first peripheral device 678 may be communicatively coupled 677 to the server system 674. The connection 677 between the first peripheral device 678 may be a wired, wireless or other connection. In some embodiments, the second peripheral device 688 may be communicatively coupled 690 to the server system 674. The connection 690 between the second peripheral device 688 and the server system 674 may be a wired, wireless or other connection.

In some embodiments of the present invention, a first user at the first peripheral device 678 may initiate a communication session with a second user at the second peripheral device 688. Exemplary communication sessions may include a chat session, an instant-messaging session or other communication session. In some embodiments of the present invention, the first content-consumption device 670 and the first peripheral device 678 may be associated at the server system 674. This association may be based on owner or user or other commonality between the first content-consumption device 670 and the first peripheral device 678.

In some embodiments of the present invention, the server system 674 may receive a message from the first user with an intended recipient of the second user in the communication session between the first user and the second user. The server system 674 may parse, interpret or otherwise examine the message to determine a communication session topic or topics. In some embodiments, the communication session topic, or topics, may be determined based on the content being consumed on the first content-consumption device 670.

Figure 25:
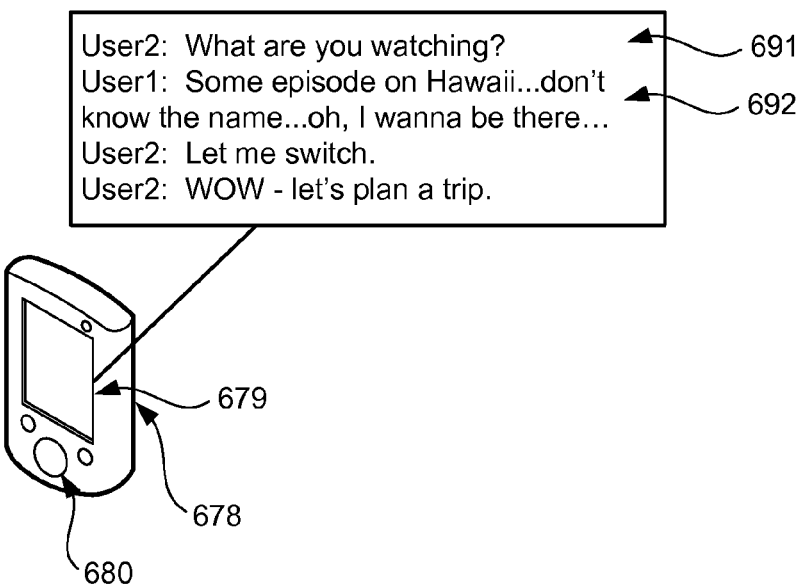
FIG. 25 is a drawing illustrating embodiments of the present invention comprising communication between a first device associated with a content consumption device and a second device.
Figure 26:
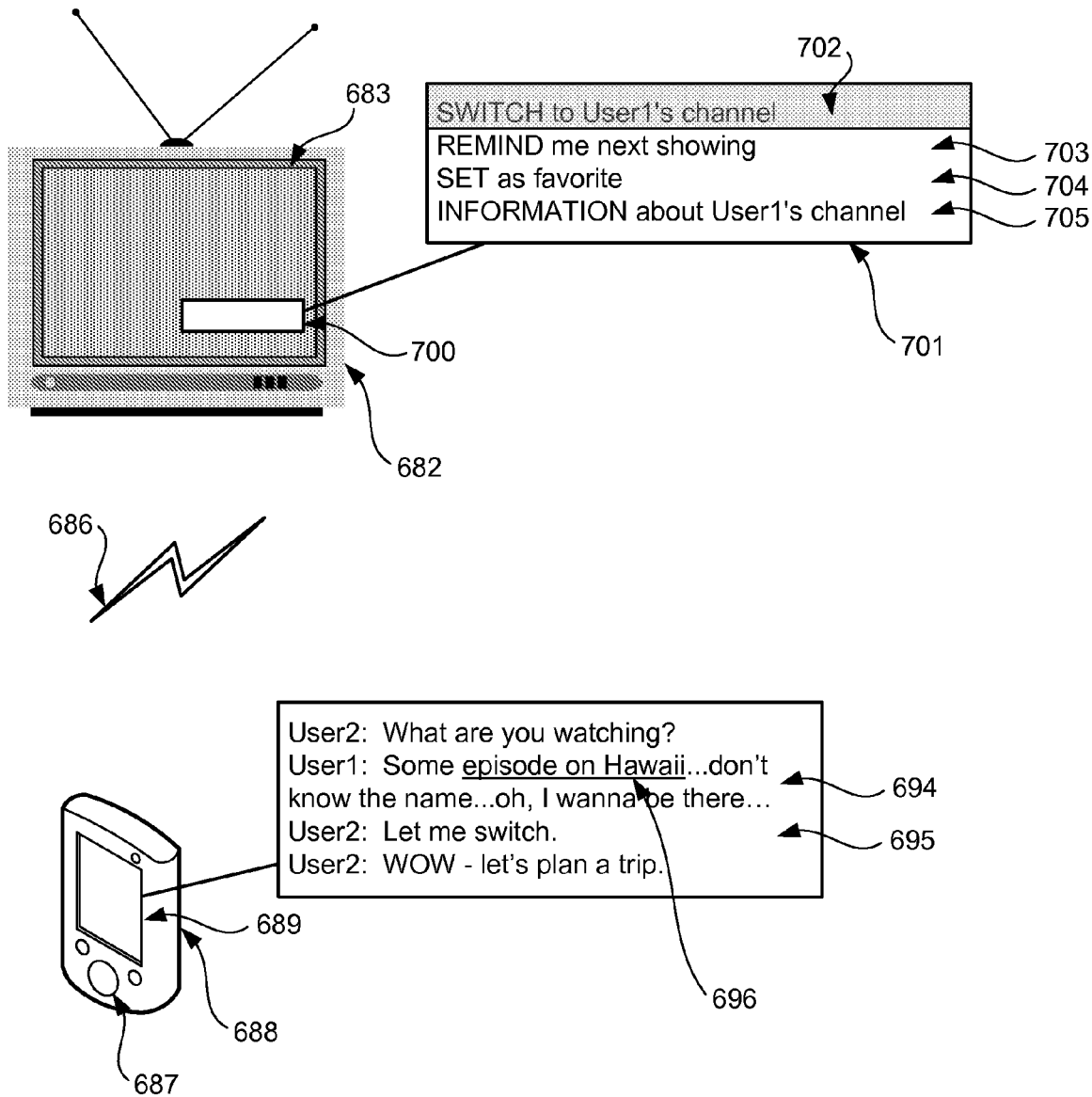
FIG. 26 is a drawing illustrating embodiments of the present invention comprising message augmentation.

Some embodiments of the present invention may be described in relation to an exemplary communication scenario illustrated in relation to FIG. 24, FIG. 25 and FIG. 26. While consuming content from the first content-consumption device 670, a first user may be communicating, using the first peripheral device 678, with a second user. The second user may be associated with the second content-consumption device 682 and, the second peripheral device 688.

The first user may receive at the first peripheral device 678 a first text communication 691 which may be displayed on the first peripheral device 678 display 679. The first user may respond with a second text communication 692 using the first peripheral device 678 I/O interface 680. The server system 674 may receive the second text communication 692 from the first peripheral device 678, and the server system 674 may interpret the second text communication 692. The server system interpretation process may comprise parsing the communication 692 for specific keywords related to content-consumption. Exemplary keywords may include episode, program, movie, show, comedy, sitcom, watch, cartoon and other keywords and derivatives of such keywords. In some embodiments, the server system 674 may further examine words in relation to detected keywords to establish a topic of interest to the communicating users. In some embodiments of the present invention, the server system 674 may be aware of an association between the first peripheral device 678 and the first content-consumption device 670, and the server system 674 may determine through communication with the first content-consumption device 670 information regarding the currently consumed content at the first content-consumption device 670.

After the server system 674 has ascertained a communication topic, or topics, the server system 674 may augment the communication received from the first user with links 696 or other information. The augmented message 694 may be sent to the second user. The augmented message 694 may be displayed on the second peripheral device 688 display 689. In some embodiments, the augmented message 694 may be sent to the first user also so that the displayed message at the first user's communication device 678 may reflect the same message sent to the second user. In alternative embodiments (shown here), the first peripheral device 678 display 679 may reflect the second text message 692 as generated by the first user. The second user may use the I/O interface 687 on the second peripheral device 688 to respond to the message 694 with a new text message 695.

In some embodiments, in addition to sending the augmented message 694 to the second peripheral device 688, the server system 674 may indirectly control the second content-consumption device 682 in relation to the communication with the first user. In some embodiments of the present invention, a menu of options 701 may be presented on the display 683 of the second content-consumption device 682. In some embodiments, the menu 701 may be displayed as a picture-within-a-picture 700 with the content being consumed from the second content-consumption device 682. The user may select one of the options 702 using an I/O interface integral to the second content-consumption device 682, an I/O interface on a remote-control device associated with the second content-consumption device 682, an I/O interface 687 on the second peripheral device 688 or other I/O interface. Exemplary options may include setting the second content-consumption device 682 so that the second content-consumption device 682 may present the same content 702 as the first content-consumption device 671, setting a reminder for when the content is next scheduled to be shown 703, setting the content as a favorite 704, presenting additional information 705 about the source of the content and other options.

Figure 27:
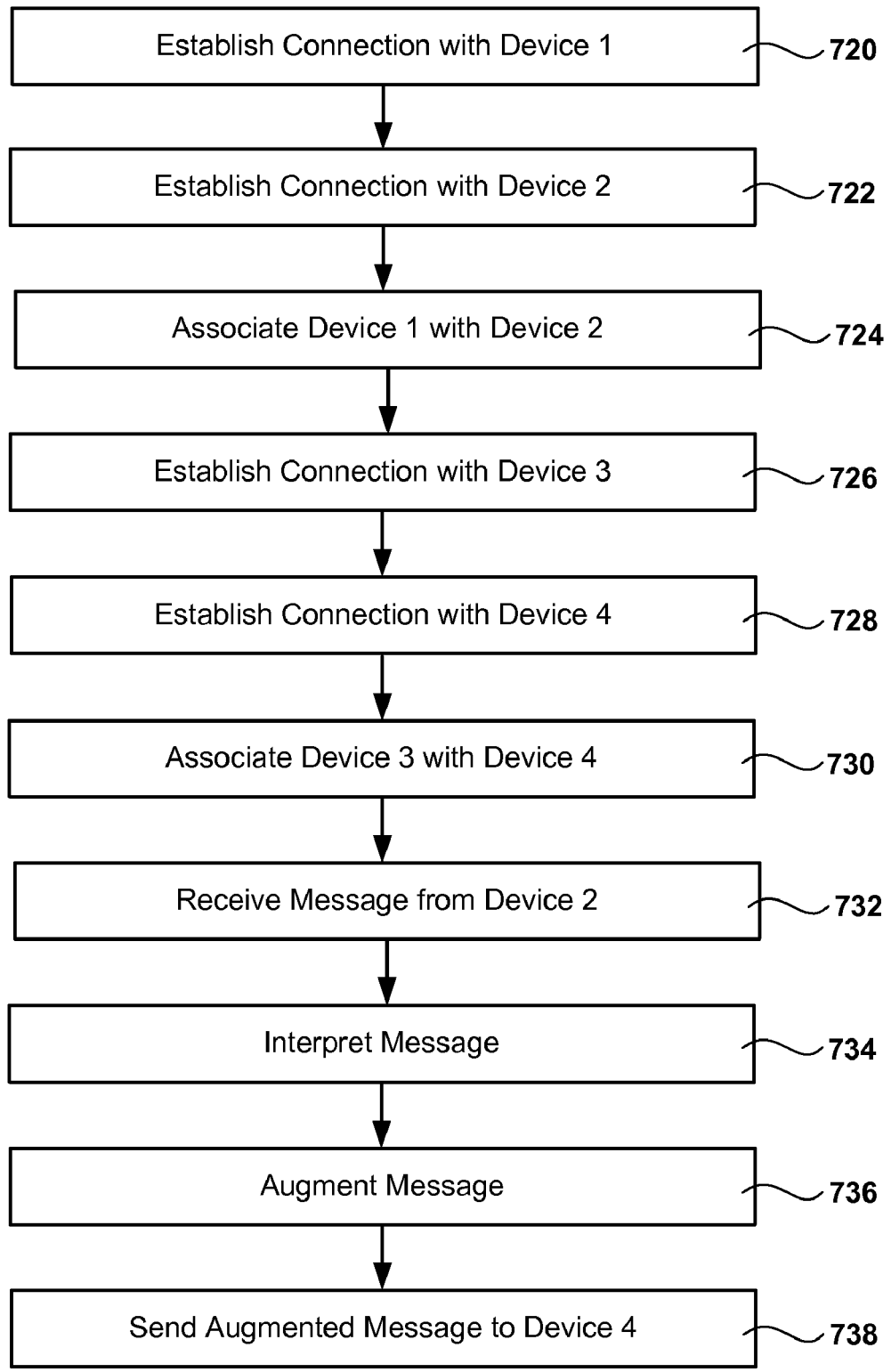
FIG. 27 is a chart showing embodiments of the present invention comprising message augmentation based on interpretation of the message content.

Some embodiments of the present invention may be described in relation to FIG. 27. In these embodiments, a connection may be established at a server system with a first device 720. A connection may be established at the server system with a second device 722. The first device and the second device may be associated with each other 724 at the server system. In some embodiments of the present invention, the first device may be a content-consumption device. In some embodiments of the present invention, the second device may be a handheld device, a communication device, a computing device or other device. The server system may establish a connection with a third device 726, and the server system may establish a connection with a fourth device 728. The third device and the fourth device may be associated with each other 730 at the server system. In some embodiments of the present invention, the third device may be a content-consumption device. In some embodiments of the present invention, the fourth device may be a handheld device, a communication device, a computing device or other device. A message may be received at the server system from the second device 732. The server system may interpret 734 the received message and augment 736 the received message. The server system may send the augmented message to the fourth device 738. In some embodiments of the present invention, the server system may interpret 734 the received message to determine a topic of interest. The server system may augment 736 the received message with additional information related to the determined topic of interest. In some embodiments of the present invention, the augmentation may comprise a pointer in the message to additional information related to the topic of interest. In some embodiments, the pointer may comprise a URL.

Figure 28:
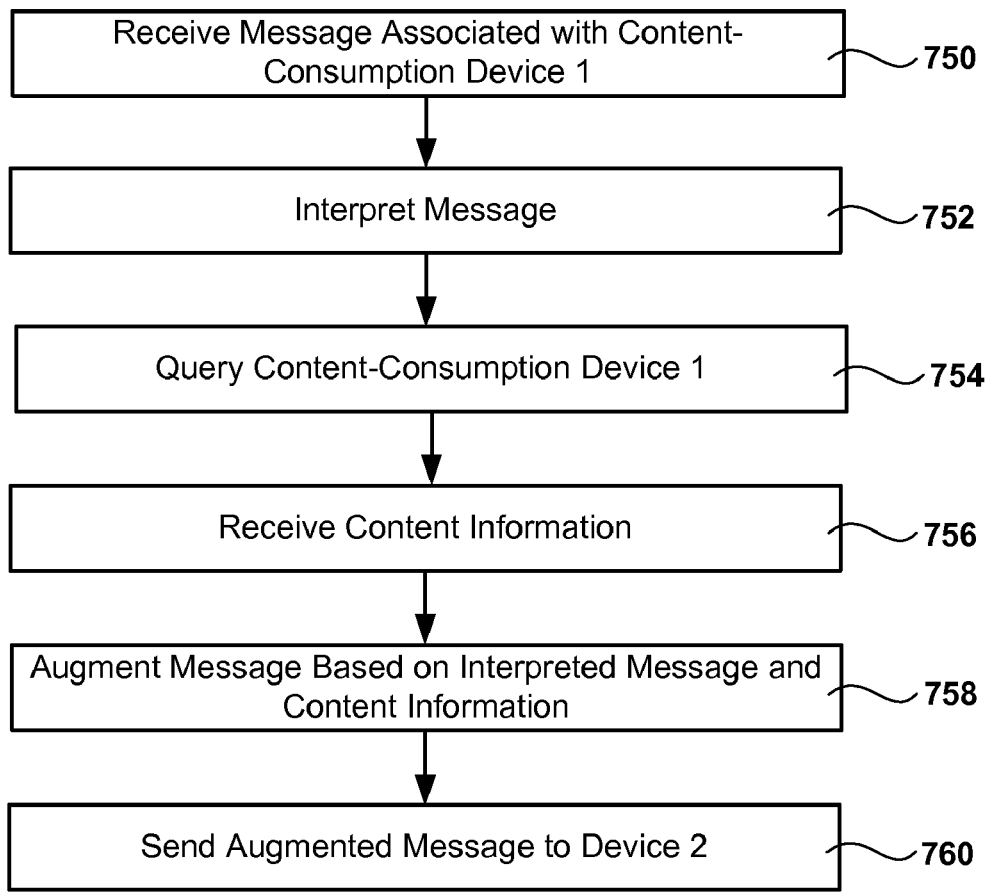
FIG. 28 is a chart showing embodiments of the present invention comprising augmentation of a message between a content-consumption device and another device based on the content consumed at the content-consumption device.

Some embodiments of the present invention may be described in relation to FIG. 28. A server system may receive 750 a message associated with a first content-consumption device. The server system may interpret the message 752. In some embodiments of the present invention, the server system may interpret the message 752 to determine a topic of interest from the message. The server system may query 754 the first content-consumption device for information regarding the content being consumed from the first content-consumption device. The server system may receive 756 content information from the first content-consumption device. The server system may augment 758 the received message based on the message interpretation and the content information received from the first content-consumption device. In some embodiments, the server system may augment 758 the received message to include additional information related to the determined topic of interest. The server system may send 760 the augmented message to a second device. In some embodiments of the present invention, the second device may be a second content-consumption device. In alternative embodiments of the present invention, the second device may be a device associated with a second content-consumption device. In still alternative embodiments, the second device may be a communication, handheld, computing or other device.

Figure 29:
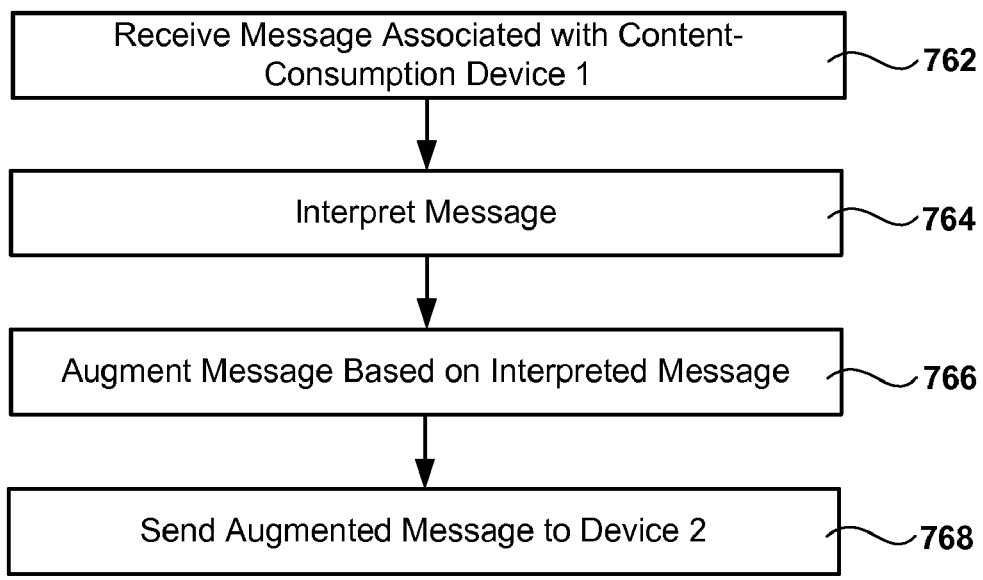
FIG. 29 is a chart showing embodiments of the present invention comprising message augmentation of a message between devices based on the message content.

Some embodiments of the present invention may be described in relation to FIG. 29. A server system may receive 762 a message associated with a first content-consumption device. The server system may interpret the message 764. In some embodiments of the present invention, the server system may interpret the message 764 to determine a topic of interest from the message. The server system may augment 766 the received message based on the message interpretation. In some embodiments, the server system may augment 766 the received message to include additional information related to the determined topic of interest. The server system may send 768 the augmented message to a second device. In some embodiments of the present invention, the second device may be a second content-consumption device. In alternative embodiments of the present invention, the second device may be a device associated with a second content-consumption device. In still alternative embodiments, the second device may be a communication, handheld, computing or other device.

Figure 30:
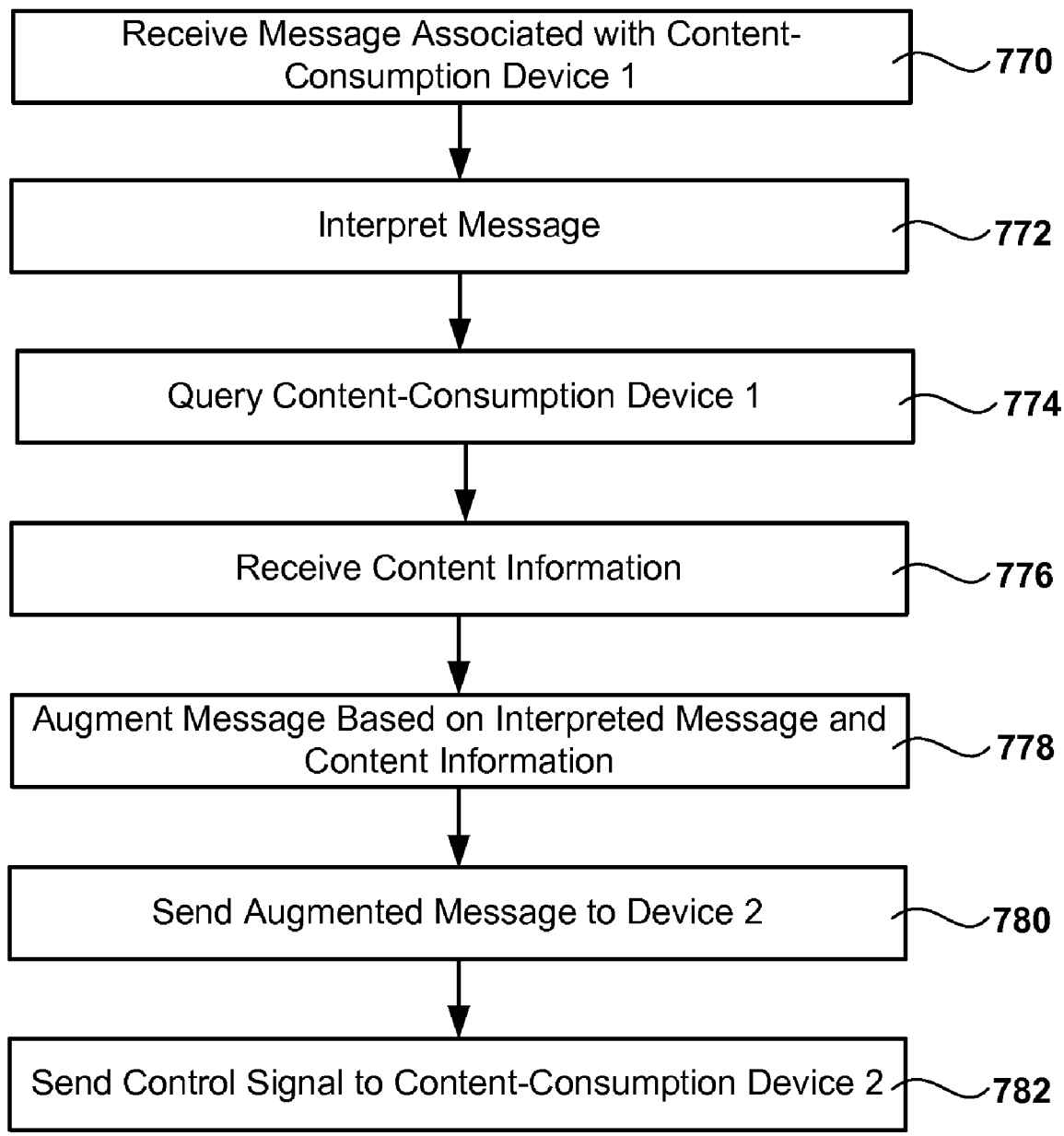
FIG. 30 is a chart showing embodiments of the present invention comprising controlling a second content-consumption device from a server system based on message content from and content-consumption at a first content-consumption device.

Some embodiments of the present invention may be described in relation to FIG. 30. A server system may receive 770 a message associated with a first content-consumption device. The server system may interpret the message 772. The server system may query 774 the first content-consumption device for information regarding the content being consumed from the first content-consumption device. The server system may receive 776 the content information from the first content-consumption device. The server system may augment 778 the received message based on the message interpretation and the content information received from the first content-consumption device. The server system may send the augmented message 780 to a second device. In some embodiments of the present invention, the second device may be a second content consumption device. In alternative embodiments of the present invention, the second device may be a device associated with a second content-consumption device. In still alternative embodiments, the second device may be a communication, handheld, computing or other device. The server system may send a control signal 782 to a second content-consumption device. In some embodiments, the second device may be the same device as the second content-consumption device. In alternative embodiments, the second device may be distinct from the second content-consumption device. In some embodiments, the control signal may be a signal which directly controls the second content-consumption device.

Figure 31:
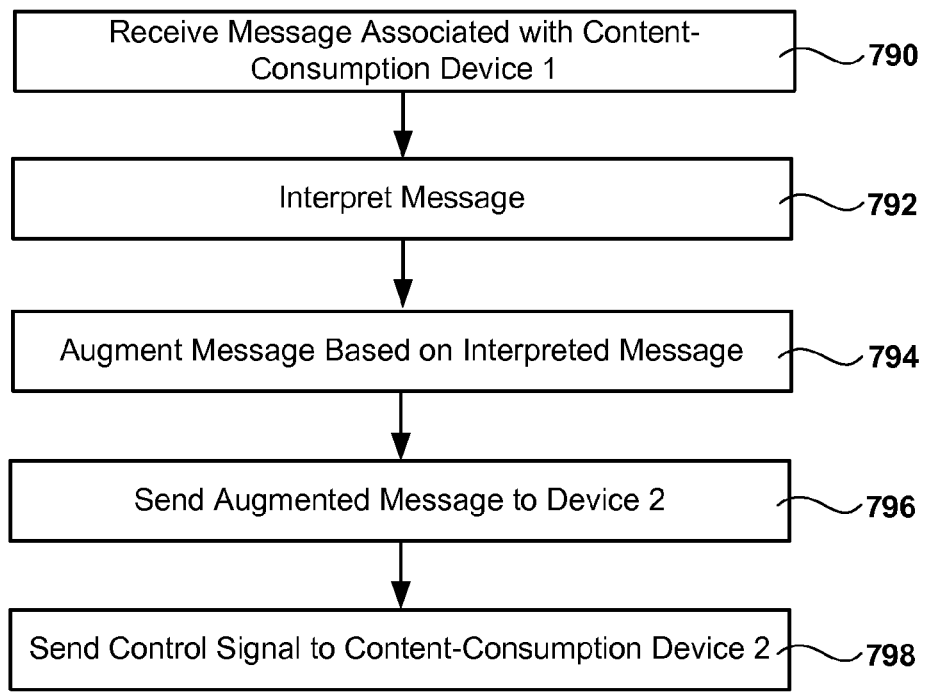
FIG. 31 is a chart showing embodiments of the present invention comprising controlling a second content-consumption device from a server system based on message content from a first content-consumption device.

Some embodiments of the present invention may be described in relation to FIG. 31. A server system may receive 790 a message associated with a first content-consumption device. The server system may interpret the message 792. The server system may augment 794 the received message based on the message interpretation. The server system may send the augmented message 796 to a second device. In some embodiments of the present invention, the second device may be a second content consumption device. In alternative embodiments of the present invention, the second device may be a device associated with a second content-consumption device. In still alternative embodiments, the second device may be a communication, handheld, computing or other device. The server system may send a control signal 798 to a second content-consumption device. In some embodiments, the second device may be the same device as the second content-consumption device. In alternative embodiments, the second device may be distinct from the second content-consumption device. In some embodiments, the control signal may be a signal which directly controls the second content-consumption device.

In some embodiments of the present invention, a server system may send to a device a component required for accessing or otherwise viewing the information augmenting a message. An exemplary component may include a plug-in, a transcoder, an application, a software module, an applet or other component.

In some embodiments of the present invention, a user preference may be used by a server system in determining a topic of interest. In some embodiments of the present invention, a user preference may be used in determining with what information to augment a message.

In some embodiments of the present invention, a message may be augmented with information comprising a pointer to information related to a topic of interest. In some embodiments, the pointer may comprise a URL.

Figure 32:
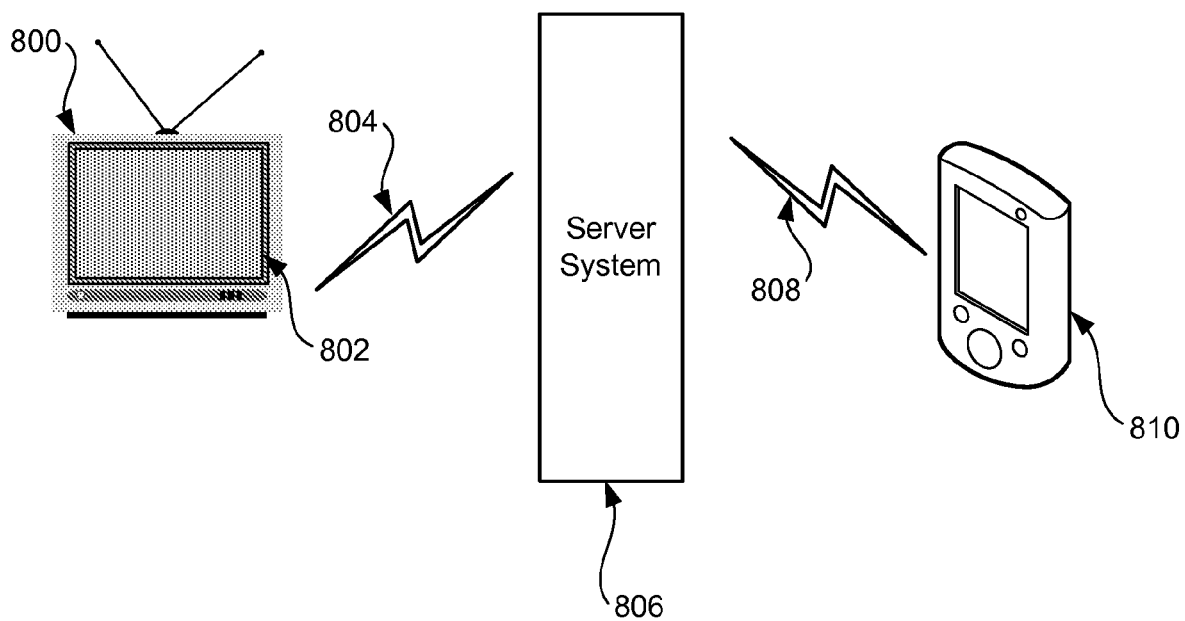
FIG. 32 is a drawing illustrating embodiments of the present invention comprising a server system, a content-consumption device and a monitoring device.

Some embodiments of the present invention may be described in relation to FIG. 32. In these embodiments, a content-consumption device 800 may be communicatively coupled 804 to a server system 806. The connection 804 between the content-consumption device 800 and the server system 806 may be a wired, wireless or other connection. In some embodiments, the content-consumption device 800 may comprise a display 802 on which content may be viewed. In alternative embodiments, the content-consumption device may comprise alternative methods for content consumption. An exemplary alternative content-consumption method may comprise audio. The server system 806 may be communicatively coupled 808 to a second device 810. The second device 810 may be referred to as a monitoring device. The connection 808 between the monitoring device 810 and the server system 806 may be wired, wireless or other connection. In some embodiments of the present invention, communication between the server system 806 and the content-consumption device 800 may use the RTR database construct and management logic described in previous embodiments. In some embodiments of the present invention, communication between the server system 806 and the monitoring device 810 may use the RTR database construct and management logic described in previous embodiments.

In some embodiments of the present invention, the content-consumption device 800 may be associated with a preferences data construct. In some embodiments, the preferences data construct may comprise a data file, a database or other data storage mechanism. In some embodiments, the preferences data construct may have an entry corresponding to remote monitoring. The remote monitoring entry may indicate a preference for enabling or disabling a remote monitoring capability.

In these embodiments, a connection 804 to the server system 806 may be initiated from the content-consumption device 800. In some embodiments, a user may use a single button on the content-consumption device 800 to initiate the connection. In an exemplary embodiment, the content-consumption device 800 may be a television, and connection to the server system 806 may be initiated by a single-button press on the remote control associated with the television. In alternative embodiments, connection to the server system 806 may be initiated when the content-consumption device 800 is powered up. In still alternative embodiments, connection to the server system 806 may be initiated by a combination of button presses on the content-consumption device 800, by a menu selection from the content-consumption device 800 or other methods. The server system 806 may authenticate the content-consumption device 800, and once authenticated, an updated registration and discovery list of devices available to the content-consumption device 800 may be sent to the content-consumption device 800. In some embodiments, the discovery list may be based on preferences set by a user. In some embodiments, the server system 806 may authenticate the content-consumption device 800 based on a device password. In alternative embodiments, the server system 806 may authenticate the device 800 based on a user password. In some embodiments of the present invention, the preferences data construct may be associated with the content-consumption device 800. In alternative embodiments, the preferences data construct may be associated with a user.

A connection 808 to the server system 806 may be initiated from the monitoring device 810. In some embodiments, a user may use a single button on the monitoring device 810 to initiate the connection. Connection to the server system 806 may be initiated by a single-button press on the monitoring device 810. In alternative embodiments, connection to the server system 806 may be initiated when the monitoring device 810 is powered up. In still alternative embodiments, connection to the server system 806 may be initiated by a combination of button presses on the monitoring device 810, by a menu selection from the monitoring device 810 or other methods. The server system 806 may authenticate the monitoring device 810, and once authenticated, an updated registration and discovery list of devices available to the monitoring device 810 may be sent to the monitoring device 810. In some embodiments, the discovery list may be based on preferences set by a user. In some embodiments, the server system 806 may authenticate the monitoring device 810 based on a device password. In alternative embodiments, the server system 806 may authenticate the monitoring device 810 based on a user password.

In some embodiments of the present invention, the monitoring device 810 may log in to a monitoring application at the server system 806. In these embodiments, the server system 806 may indicate to the monitoring device 810 which of the content-consumption devices, for which the monitoring device 810 may monitor, are in a powered-on state. In alternative embodiments, the monitoring device 810 may select a content-consumption device from the discovery list, and the monitoring device 810 may then select a monitoring application in relation to the specifically selected content-consumption device.

Figure 33:
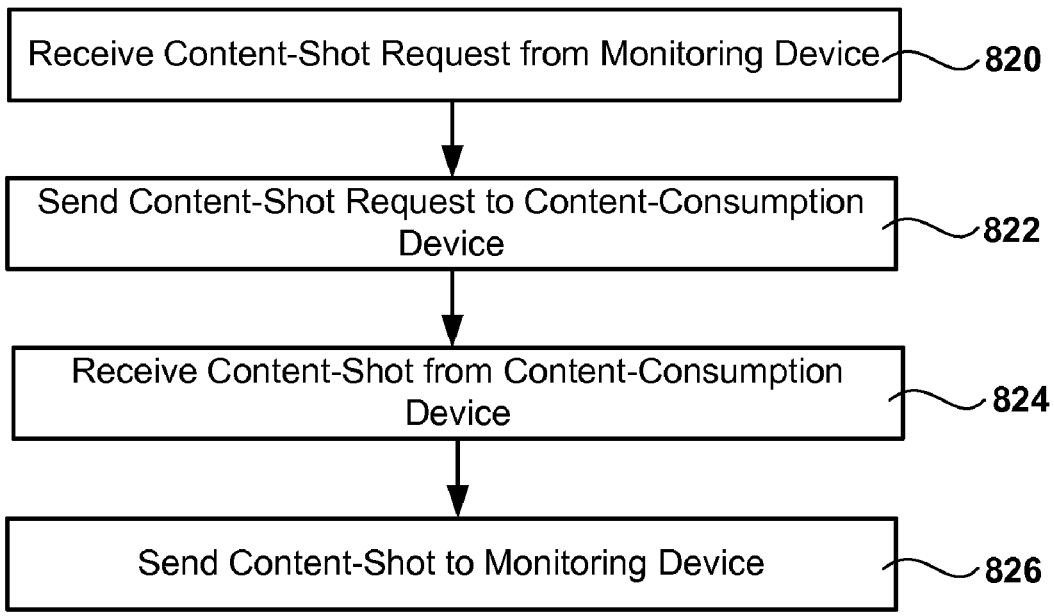
FIG. 33 is a chart showing embodiments of the present invention comprising a server system receiving a content-capture request from a monitoring device.

In some embodiments of the present invention described in relation to FIG. 33, a server system 806 may receive 820 a "content-shot" request, also considered a content-capture request, from a monitoring device 810. The server system 806 may send 822 a "content-shot" request to a content-consumption device 800. The server system 806 may receive 824 a "content-shot," also considered a captured content, from the content-consumption device 800. The server system 806 may send 826 the "content-shot" to the monitoring device 810. In some embodiments of the present invention wherein the content-consumption device may be a device for consuming video content, a "content-shot" may comprise a screen shot. The screen shot may correspond to a single frame of the video content. In alternative embodiments wherein the content-consumption device may be a device for consuming video content, the "content-shot" may comprise a video clip with or without the associated audio. In still alternative embodiments of the present invention wherein the content-consumption device may be a device for consuming video content, the "content-short" may comprise an audio clip associated with the video content. In embodiments of the present invention wherein the content-consumption device may be a device for consuming audio content, the "content-shot" may comprise an audio clip. In some embodiments of the present invention, the "content-shot" may correspond to a sample of the content being consumed on the content-consumption device. In alternative embodiments of the present invention, the "content-shot" may be meta-data associated with the content being consumed on the content-consumption device.

Figure 34:
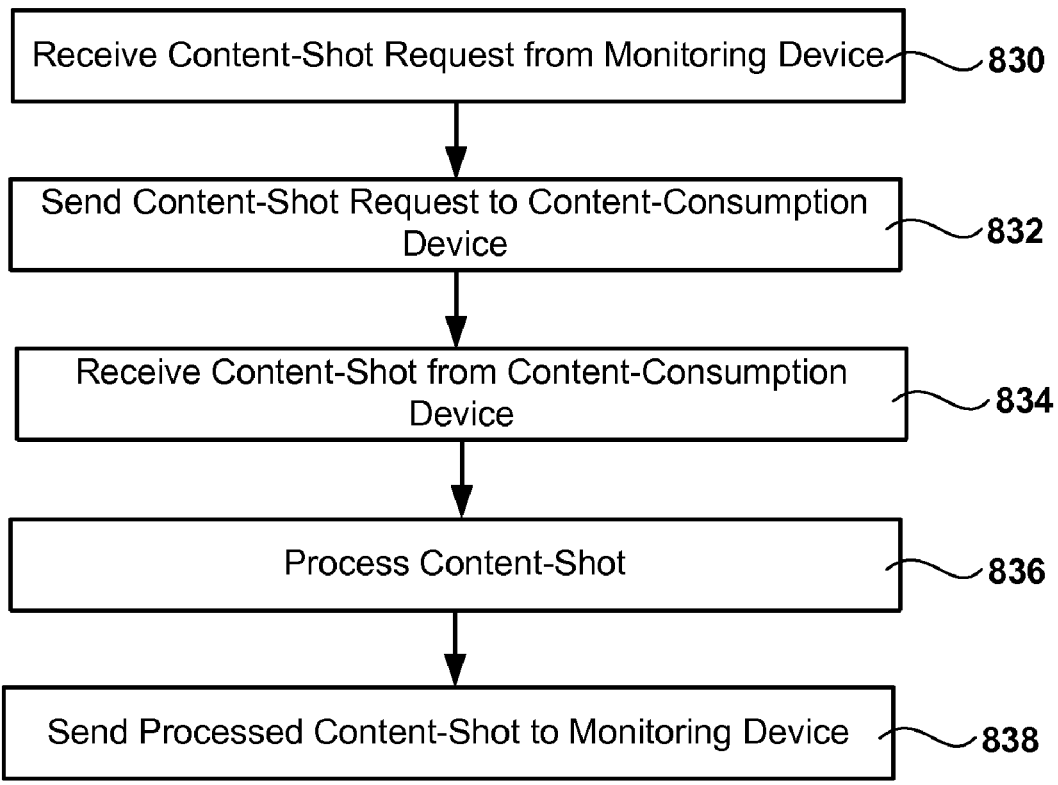
FIG. 34 is a chart showing embodiments of the present invention comprising a server system processing captured-content.

In some embodiments of the present invention described in relation to FIG. 34, a server system 806 may receive 830 a "content-shot" request from a monitoring device 810. The server system 806 may send 832 a "content-shot" request to a content-consumption device 800. The server system 806 may receive 834 a "content-shot" from the content-consumption device 800. The server system 806 may process 836 the received "content-shot." In some embodiments of the present invention, the processing may transform the "content-shot" in order to match content characteristics. In some embodiments, the content characteristics may be related to characteristics of the monitoring device 810. In alternative embodiments, the content characteristics may be related to characteristics of the communication channel between the server system 806 and the monitoring device 810. In still alternative embodiments, the content characteristics may be related to user preferences at the monitoring device 810. The server system 806 may send 838 the processed "content-shot" to the monitoring device 810.

In exemplary embodiments wherein the content-consumption device 800 may be a device for consuming video content, the "content-shot" may be a screen shot comprising a digital image. In some of these embodiments, the processing may comprise image processing which may transform the screen-shot digital image to a digital image suited for viewing on the monitoring device 810. In alternative embodiments, the processing may comprise image processing which may transform the screen-shot digital image to a digital image comprising fewer data bits for more reliable communication between either the connection between the content-consumption device 800 and the server system 806 or the server system 806 and the monitoring device 810.

Figure 35:
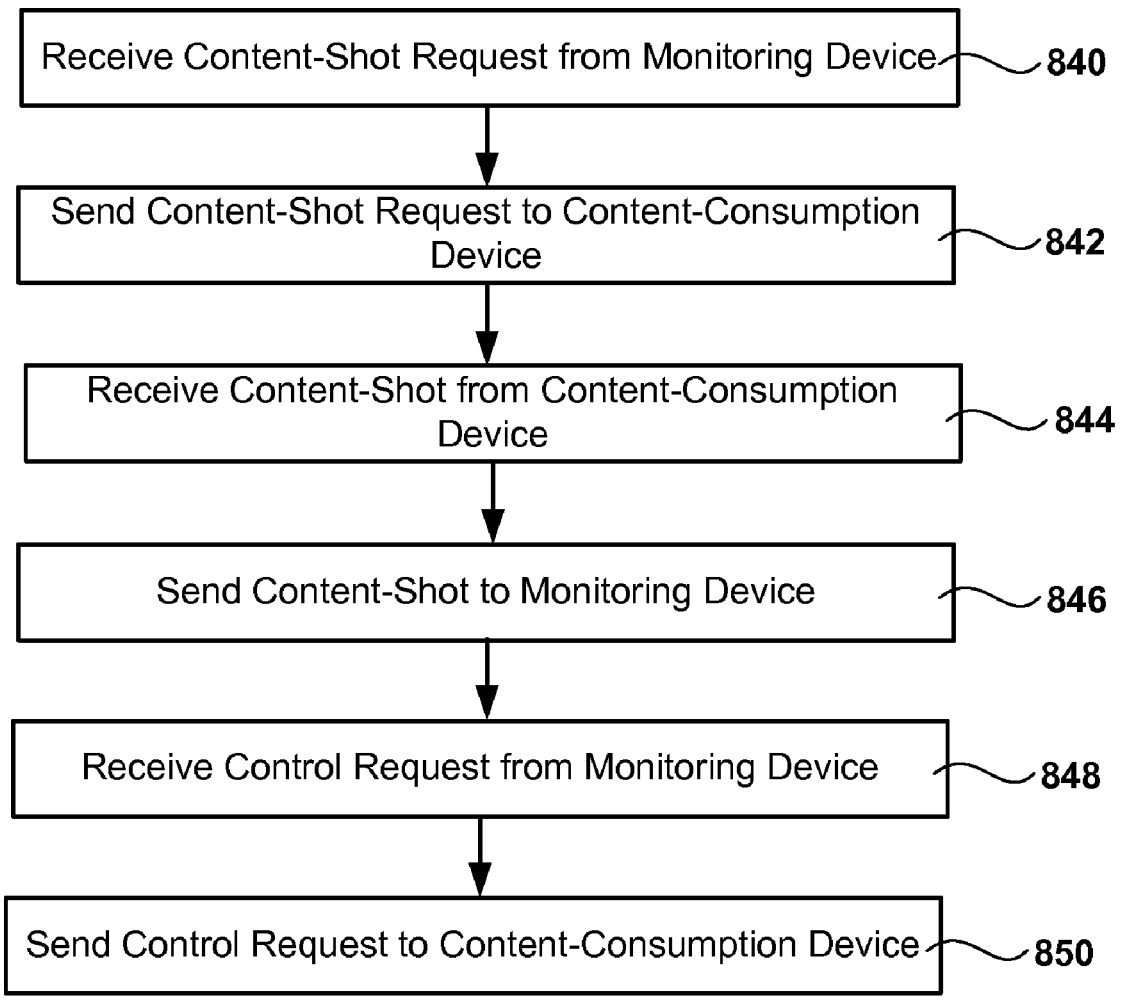
FIG. 35 is a chart showing embodiments of the present invention comprising a server system controlling a content-consumption device based on a control request from a monitoring device.

In some embodiments of the present invention described in relation to FIG. 35, a server system 806 may receive 840 a "content-shot" request from a monitoring device 810. The server system 806 may send 842 a "content-shot" request to a content-consumption device 800. The server system 806 may receive 844 a "content-shot" from the content-consumption device 800. The server system 806 may send 846 the "content-shot" to the monitoring device 810. The server system 806 may receive 848 a control request from the monitoring device 810. Exemplary control requests may include a power-off request, a channel-change request and other requests related to the control of a content-consumption device. The server system 806 may send 850 the control request to the content-consumption device 800. In some embodiments of the present invention, the "content-shot" may be processed at the server system 806, and a processed "content-shot" may be sent to the monitoring device 810.

Figure 36:
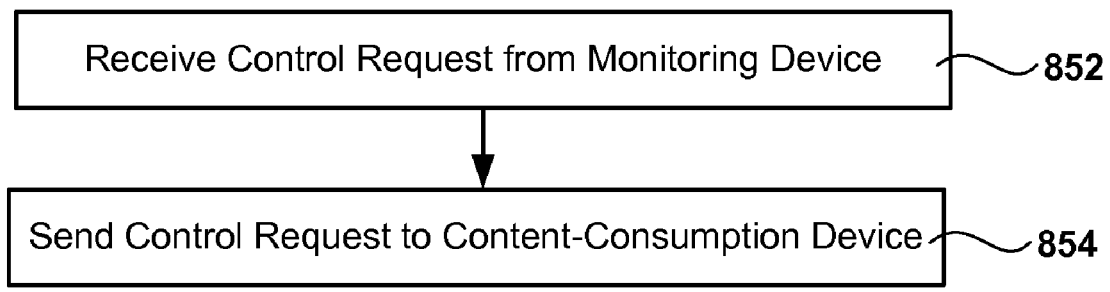
FIG. 36 is a chart showing embodiments of the present invention comprising a server system controlling a content-consumption device based on a control request from a monitoring device.

In some embodiments of the present invention described in relation to FIG. 36, a server system 806 may receive 852 a control request from a monitoring device 810. Exemplary control requests may include a power-off request, a channel-change request and other requests related to the control of a content-consumption device. The server system 806 may send 854 the control request to a content-consumption device 800.

Figure 37:
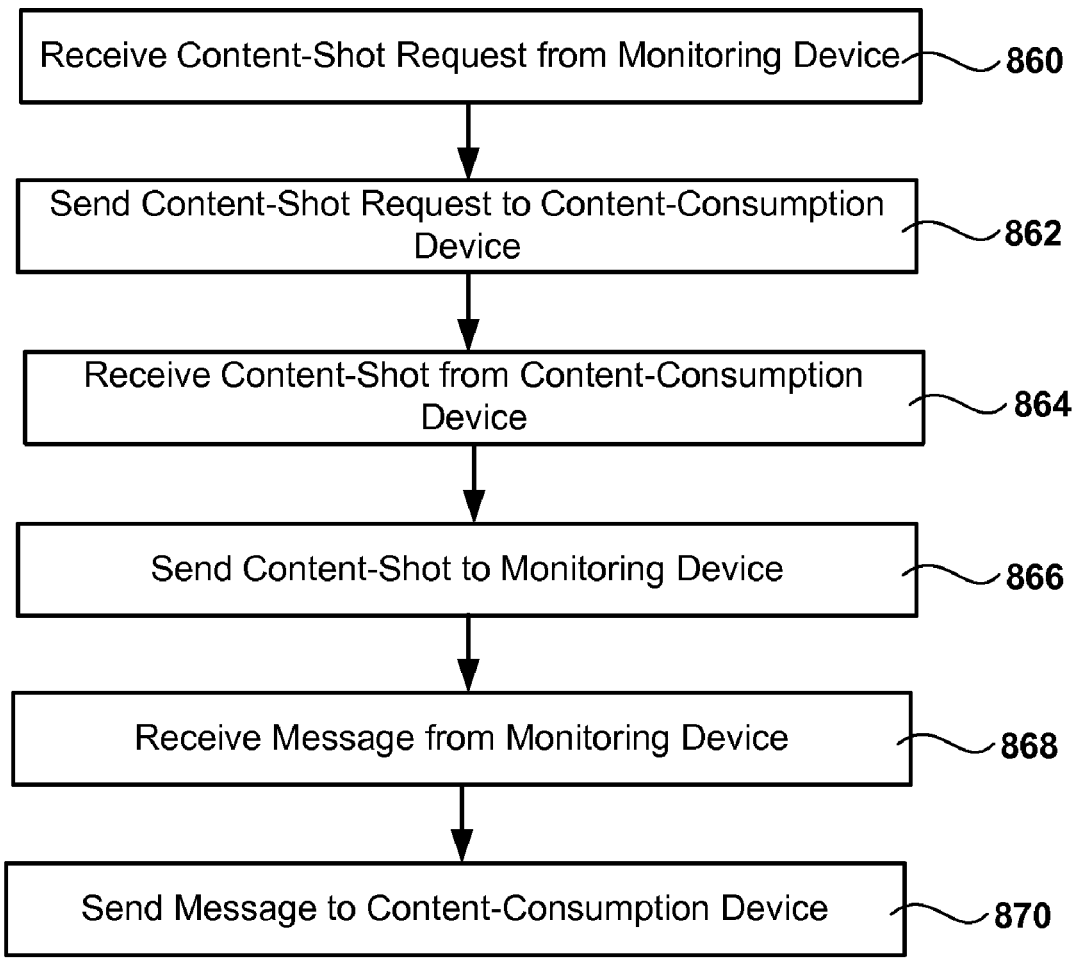
FIG. 37 is a chart showing embodiments of the present invention comprising a server system messaging a content-consumption device based on a message from a monitoring device.

In some embodiments of the present invention described in relation to FIG. 37, a server system 806 may receive 860 a "content-shot" request from a monitoring device 810. The server system 806 may send 862 a "content-shot" request to a content-consumption device 800. The server system 806 may receive 864 a "content-shot" from the content-consumption device 800. The server system 806 may send 866 the "content-shot" to the monitoring device 810. The server system 806 may receive 868 a display message from the monitoring device 810. The server system 806 may send 870 the display message to the content-consumption device 800. In some embodiments of the present invention, the "content-shot" may be processed at the server system 806, and a processed "content-shot" may be sent to the monitoring device 810.

Figure 38:
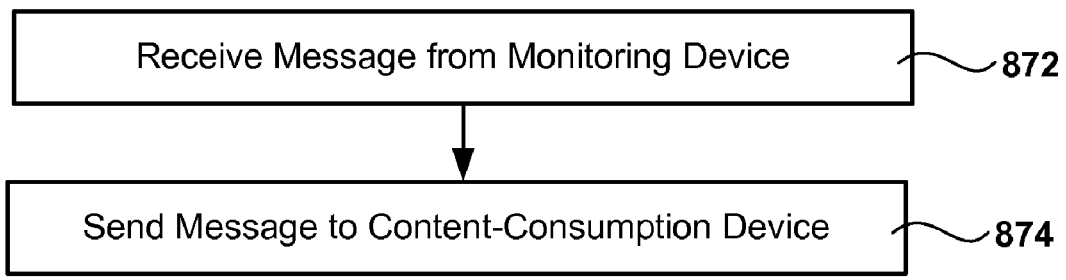
FIG. 38 is a chart showing embodiments of the present invention comprising a server system messaging a content-consumption device based on a message from a monitoring device.

In some embodiments of the present invention described in relation to FIG. 38, a server system 806 may receive 872 a display message from a monitoring device 810. The server system 806 may send 874 the display message to a content-consumption device 800.

Figure 39:
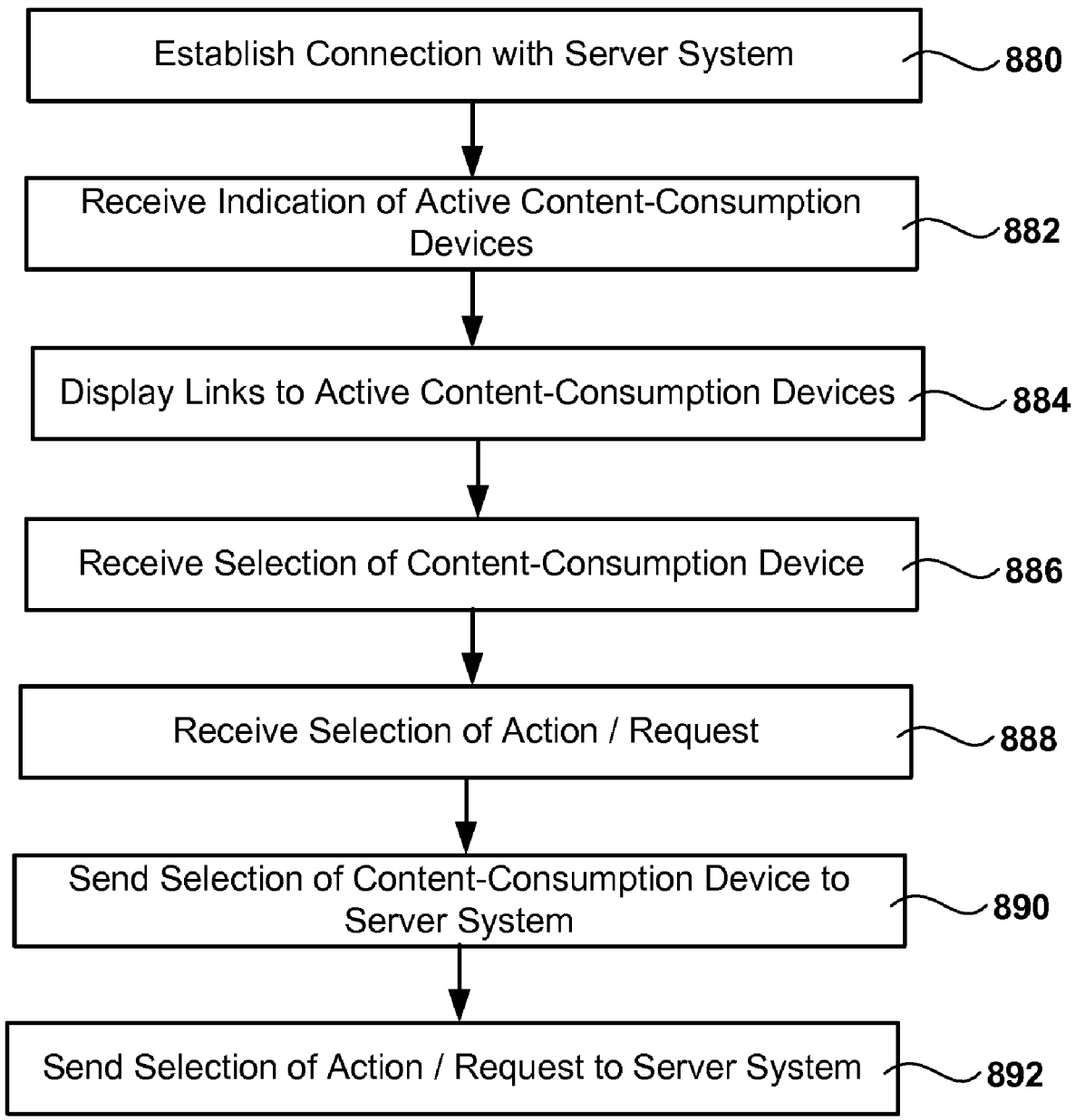
FIG. 39 is a chart showing embodiments of the present invention comprising a monitoring device wherein the monitoring device may control and/or monitor a content-consumption device through a server system.

In some embodiments of the present invention described in relation to FIG. 39, a monitoring device 810 may establish 880 a connection with a server system 806. The monitoring device 810 may receive 882 from the server system 806 a list, or other indication, of the content-consumption devices that are currently active. In some embodiments, a content-consumption device may be considered active if it is powered on. In alternative embodiments, a content-consumption device may be considered active if it is powered on and a monitoring capability enabled. The monitoring device 810 may display 884 links to the active content-consumption devices. The monitoring device 810 may receive 886 a selection of an active content-consumption device. The monitoring device 810 may receive 888 a selection of an action or request. The monitoring device may send 890 the content-consumption device selection to the server system 806. The monitoring device may send 892 the action or request selection to the server system 806. Exemplary actions or request may include a "content-shot" request, a control request, a message and other actions and requests related to monitoring and control.

Figure 40:
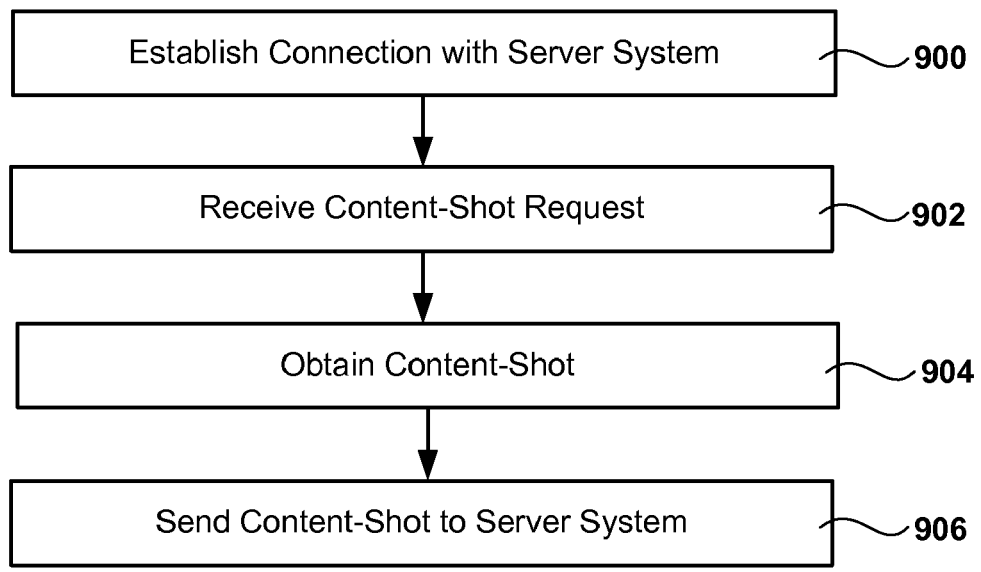
FIG. 40 is chart showing embodiments of the present invention comprising a content-consumption device capturing content and sending the captured content to a server system.

Some embodiments of the present invention may be described in relation to FIG. 40. In these embodiments, a content-consumption device 800 may establish 900 a connection with a server system 806. The content-consumption device 800 may receive 902 a "content-shot" request from the server system 806. The content-consumption device 800 may obtain 904 the "content-shot" and send 906 the "content-shot" to the server system 806.

Figure 41:
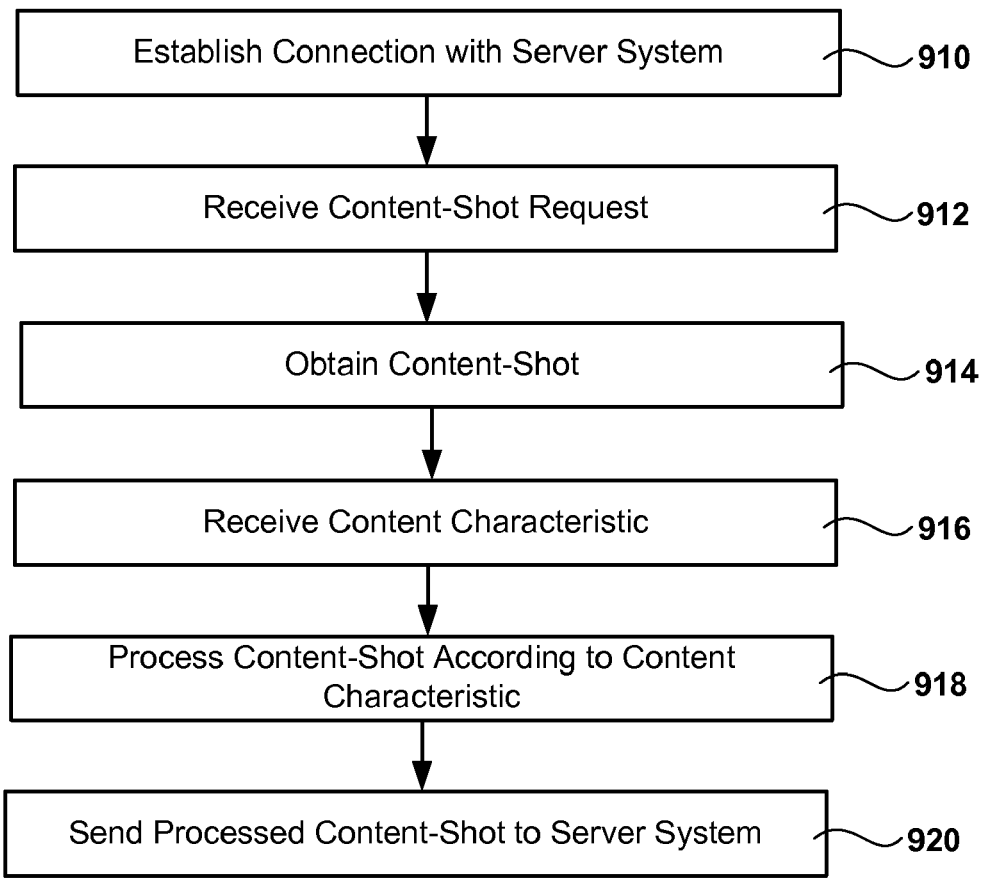
FIG. 41 is a chart showing embodiments of the present invention comprising a content-consumption device processing captured content in relation to a content characteristic.

Some embodiments of the present invention may be described in relation to FIG. 41. In these embodiments, a content-consumption device 800 may establish 910 a connection with a server system 806. The content-consumption device 800 may receive 912 a "content-shot" request from the server system 806. The content-consumption device 800 may obtain 914 the "content-shot." The content-consumption device 800 may receive 916 a content characteristic. In some embodiments, the content-consumption device 800 may receive 916 the content characteristic from the server system 806. In alternative embodiments, the content-consumption device 800 may receive 916 the content characteristic from a data structure in which a preference file may be maintained. In some embodiments, the content characteristics may be related to display characteristics of a monitoring device 810. In alternative embodiments, the content characteristics may be related to characteristics of the communication channel between the server system 806 and the monitoring device 810. In still alternative embodiments, the content characteristics may be related to user preferences at the monitoring device 810. The content-consumption device 800 may process 918 the "content-shot" according to the content characteristic. The content-consumption device 800 may send 920 the processed "content-shot" to the server system 806.

Figure 42:
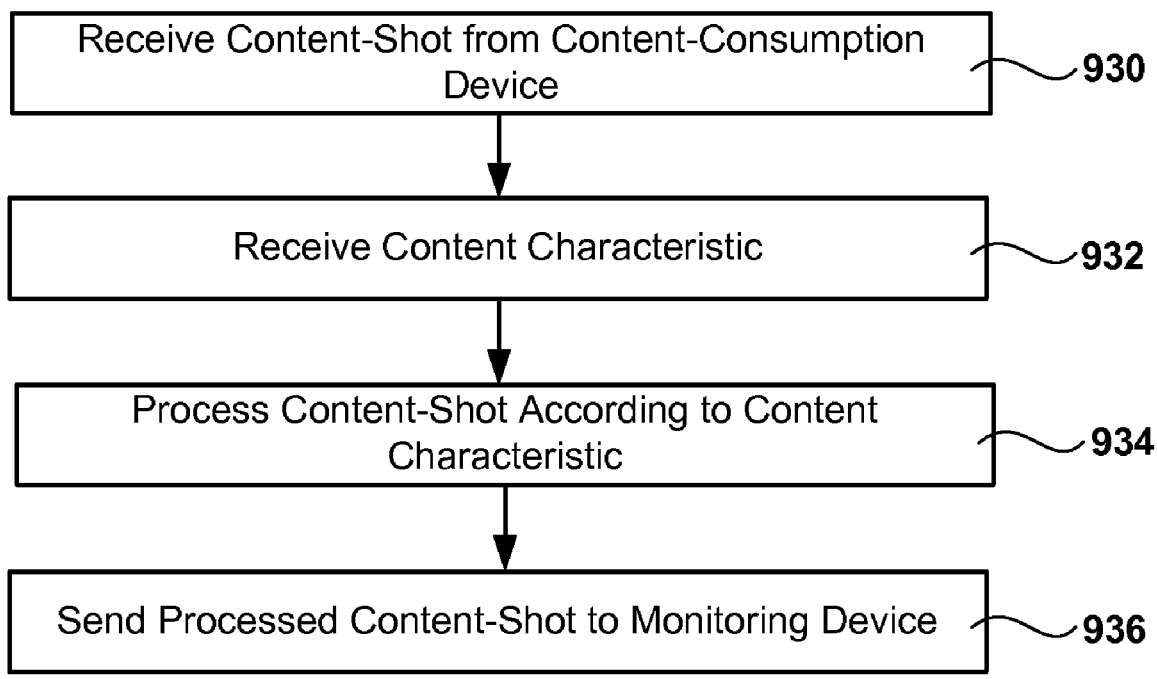
FIG. 42 is a chart showing embodiments of the present invention comprising a server system processing captured content received from a content-consumption device in relation to a content characteristic.

Some embodiments of the present invention may be described in relation to FIG. 42. In these embodiments, a server system 806 may receive 930 a "content-shot" from a content-consumption device 800. The server system 806 may receive 932 a content characteristic. In some embodiments, the server system 806 may receive 932 the content characteristic from a monitoring device 810. In alternative embodiments, the server system 806 may receive 932 the content characteristic from a data structure in which a preference file may be maintained. In some embodiments, the content characteristics may be related to display characteristics of the monitoring device 810. In alternative embodiments, the content characteristics may be related to characteristics of the communication channel between the server system 806 and the monitoring device 810. In still alternative embodiments, the content characteristics may be related to user preferences at the monitoring device 810. The server system 806 may process 934 the "content-shot" according to the content characteristic. The server system 806 may send 936 the processed "content-shot" to the monitoring device 810.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for remote monitoring and control of a content-consumption device, said method comprising:
   a) establishing a content-consumption-device connection between a first content-consumption device and a server system, wherein said first content-consumption device is a device on which a user may consume content and wherein said first content-consumption device is in a powered-on state;
   b) establishing a monitoring-device connection between a first monitoring device and said server system;
   c) receiving a first content-capture request at said server system from said first monitoring device, wherein said first content-capture request comprises a request to capture a content-shot indicative of a content being consumed on said first content-consumption device;
   d) sending, from said server system to said first content-consumption device, a second content-capture request in response to said first content-capture request;
   e) receiving a first captured content at said server system from said first content-consumption device, wherein said first captured content is indicative of a first content being consumed at said first content-consumption device; and
   f) sending a second captured content from said server system to said first monitoring device, said second captured content related to said first captured content.

2. A method according to claim 1, said method further comprising:
   a) determining a first power status of said first content-consumption device; and
   b) sending a first power-status indicator associated with said first power status to said first monitoring device from said server system.

3. A method according to claim 1, wherein said second captured content is said first captured content.

4. A method according to claim 1, said method further comprising:
   a) receiving a first action request at said server system from said first monitoring device; and
   b) sending, from said server system to said first content-consumption device, a second action request in response to said first action request.

5. A method according to claim 4, wherein said second action request is a request selected from the group consisting of a power-off request and a channel-change request.

6. A method according to claim 1, said method further comprising processing, at said server system, said first captured content to form said second captured content, wherein said second captured content is matched to a characteristic of said monitoring device.

7. A method according to claim 6, wherein said characteristic is a display characteristic of a display associated with said monitoring device.

8. A method according to claim 1, said method further comprising:
   a) receiving a first display message at said server system from said first monitoring device; and
   b) sending said first display message from said server system to said first content-consumption device for display on said first content-consumption device.

9. A method according to claim 1, wherein said first content-consumption device is a television.

10. A method according to claim 1, wherein said first monitoring device is a device selected from the group consisting of a cellular telephone, a mobile telephone, a personal digital assistant, a gaming device, a laptop computer, a computing device, a handheld device and a tablet device.

11. A method for remote monitoring and control of a content-consumption device, said method comprising:
   a) establishing a content-consumption-device connection between a content-consumption device and a server system;
   b) receiving a content-capture request at said content-consumption device from said server system, wherein said content-capture request comprises a request to capture a content-shot indicative of a content being consumed on said content-consumption device, wherein said content-consumption device is a device on which a user may consume content and wherein said content-consumption device is in a powered-on state;
   c) capturing a first captured content at said first content-consumption device, wherein said first captured content is indicative of a first content being consumed at said content-consumption device; and d) sending a second captured content from said first content-consumption device to said server system, said second captured content related to said first captured content.

12. A method according to claim 11, wherein said second captured content is said first captured content.

13. A method according to claim 11, said method further comprising:
   a) receiving a first characteristic at said content-consumption device; and
   b) processing, at said content-consumption device, said first captured content to form said second captured content, wherein said second captured content is matched to said first characteristic.

14. A method according to claim 13, wherein said first characteristic is received from said server system.

15. A method according to claim 13, wherein said first characteristic is received from a user-preference profile.

16. A method according to claim 11, said method further comprising:
   a) receiving a first action request at said content-consumption device from said server system; and
   b) performing a first action at said content-consumption device, wherein said first action is related to said first action request.

17. A method according to claim 16, wherein said first action request is a request selected from the group consisting of a power-off request and a channel-change request.

18. A method according to claim 11, wherein said content-consumption device is a television.

19. A method for remote monitoring and control of a content-consumption device, said method comprising:
   a) establishing a monitoring-device connection between a monitoring device and a server system;
   b) sending a content-capture request from said monitoring device to said server system, wherein said content-capture request comprises a request to capture a content-shot indicative of a content being consumed on a first content-consumption device, wherein said first content-consumption device is a device on which a user may consume content and wherein said first content-consumption device is in a powered-on state; and
   c) receiving a first captured content from said server system at said monitoring device, wherein said first captured content corresponds to content being consumed at said first content-consumption device.

20. A method according to claim 19, said method further comprising:
   a) receiving, at said monitoring device from said server system, a list of available content-consumption devices; and
   b) sending a content-consumption-device selection to said server system, said content-consumption-device selection corresponding to said first content-consumption device.

* * * * *